United States Patent
Ishizaki et al.

(10) Patent No.: US 7,971,434 B2
(45) Date of Patent: Jul. 5, 2011

(54) DEVICE AND METHOD FOR CONTINUOUSLY VARIABLE TRANSMISSION OF TRAVELING VEHICLE

(75) Inventors: Naoki Ishizaki, Oyama (JP); Hikosaburo Hiraki, Tokyo (JP); Koichiro Itou, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 662 days.

(21) Appl. No.: 11/988,902

(22) PCT Filed: Jul. 4, 2006

(86) PCT No.: PCT/JP2006/313295
§ 371 (c)(1),
(2), (4) Date: May 8, 2008

(87) PCT Pub. No.: WO2007/010743
PCT Pub. Date: Jan. 25, 2007

(65) Prior Publication Data
US 2009/0139224 A1 Jun. 4, 2009

(30) Foreign Application Priority Data

Jul. 22, 2005 (JP) .................... 2005-213139

(51) Int. Cl.
*F16H 47/02* (2006.01)
*E02F 9/22* (2006.01)
(52) U.S. Cl. .......................... 60/425; 60/484
(58) Field of Classification Search ............ 60/484, 60/487, 425; 180/307
See application file for complete search history.

(56) References Cited

U.S. PATENT DOCUMENTS

| 3,421,389 | A | * | 1/1969 | Fauchere | 60/484 |
| 3,465,616 | A | * | 9/1969 | Schou | 477/69 |
| 5,159,992 | A | * | 11/1992 | Reinecke et al. | 60/484 |
| 5,388,450 | A | * | 2/1995 | Hurth | 180/307 |
| 7,070,531 | B2 | * | 7/2006 | Ishizaki | 475/75 |
| 7,299,891 | B2 | * | 11/2007 | Legner | 180/307 |

FOREIGN PATENT DOCUMENTS

| JP | 2-240442 A | 9/1990 |
| JP | 11-230307 A | 8/1999 |
| JP | 11-311328 A | 11/1999 |
| JP | 2000-46151 A | 2/2002 |

OTHER PUBLICATIONS

The International Preliminary Report on Patentability of the Patent Cooperation Treaty, dated Apr. 24, 2008, issued in a counterpart International Application.

* cited by examiner

*Primary Examiner* — Thomas E Lazo
(74) *Attorney, Agent, or Firm* — Fish & Richardson P.C.

(57) ABSTRACT

A variable capacity pump and two variable capacity motors are connected in a closed circuit. First to fourth drive gears are fitted to motor shafts of the variable capacity motors via clutches. A first driven gear, which meshes with the first and third drive gears, and a second driven gear which meshes with the second and fourth drive gears are fitted to an output shaft. Equivalent capacities of the variable capacity motors are made different. Control is exerted such that the capacities are decreased to zero in order of equivalent capacities. To decrease the capacity of each variable capacity motor, the gear change ratio of the variable capacity motor the capacity of which has decreased to zero is changed to decrease the equivalent capacity and, at the same time, the capacity is increased to maximum. This increases the gear change ratio for the continuously variable transmission and controls acceleration.

18 Claims, 16 Drawing Sheets

FIG. 12

| | | STATIONARY | POINT 1 | POINT 2 | POINT 3 |
|---|---|---|---|---|---|
| ENGINE HORSEPOWER | PS | 180 | 180 | 180 | 180 |
| VARIABLE CAPACITY PUMP | | | | | |
| ROTATION NUMBER OF PUMP | rpm | 2000 | 2000 | 2000 | 2000 |
| PUMP CAPACITY | cc/rev | 0 | 120 | 120 | 120 |
| CIRCUIT PRESSURE | kg/cm² | — | 300 | 300 | 265 |
| CAPACITY EFFICIENCY: η | | | 0.91 | 0.91 | 0.91 |
| VARIABLE CAPACITY MOTOR: P1 | | | | | |
| CAPACITY | cc/rev | 160 | 160 | 0 | 0 |
| REDUCTION GEAR RATIO | | 3.86 | 3.86 | 3.86 | 3.86 |
| CAPACITY EFFICIENCY: η | | — | 0.87 | — | — |
| EQUIVALENT CAPACITY | cc/rev | 618 | 618 | 0 | 0 |
| VARIABLE CAPACITY MOTOR: P2 | | | | | |
| CAPACITY | cc/rev | 160 | 160 | 160 | 46 |
| REDUCTION GEAR RATIO | | 1 | 1 | 1 | 1 |
| CAPACITY EFFICIENCY: η | | — | 0.87 | 0.92 | 0.73 |
| EQUIVALENT CAPACITY | cc/rev | 160 | 160 | 160 | 46 |
| TOTAL OF EQUIVALENT CAPACITY | | 778 | 778 | 160 | 46 |
| OUTPUT ROTATION | rpm | 0 | 270 | 1345 | 4500 |

FIG. 13

| | | STATIONARY | POINT 1 | POINT 2 | POINT 3 | POINT 4 |
|---|---|---|---|---|---|---|
| ENGINE HORSEPOWER | PS | 180 | 180 | 180 | 180 | 180 |
| VARIABLE CAPACITY PUMP | | | | | | |
| ROTATION NUMBER OF PUMP | rpm | 2000 | 2000 | 2000 | 2000 | 2000 |
| PUMP CAPACITY | cc/rev | 0 | 120 | 120 | 120 | 120 |
| CIRCUIT PRESSURE | kg/cm² | — | 300 | 300 | 300 | 225 |
| CAPACITY EFFICIENCY: η | | 0.91 | 0.91 | 0.91 | 0.91 | 0.91 |
| VARIABLE CAPACITY MOTOR: P3 | | | | | | |
| CAPACITY | cc/rev | 100 | 100 | 0 | 100 | 46 |
| REDUCTION GEAR RATIO | | 5.3 | 5.3 | 5.3 | 1 | 1 |
| CAPACITY EFFICIENCY: η | | — | 0.92 | 0.92 | 0.92 | 0.82 |
| EQUIVALENT CAPACITY | cc/rev | 530 | 530 | 0 | 100 | 46 |
| VARIABLE CAPACITY MOTOR: P2 | | | | | | |
| CAPACITY | cc/rev | 100 | 100 | 100 | 0 | 0 |
| REDUCTION GEAR RATIO | | 2.5 | 2.5 | 2.5 | 2.5 | 2.5 |
| CAPACITY EFFICIENCY: η | | — | 0.88 | 0.92 | — | — |
| EQUIVALENT CAPACITY | cc/rev | 250 | 250 | 250 | 0 | 0 |
| TOTAL OF EQUIVALENT CAPACITY | | 780 | 780 | 250 | 100 | 46 |
| OUTPUT ROTATION | rpm | 0 | 320 | 855 | 2150 | 4500 |

DEVICE AND METHOD FOR CONTINUOUSLY VARIABLE TRANSMISSION OF TRAVELING VEHICLE

This application is a U.S. National Phase Application under 35 USC 371 of International Application PCT/JP2006/313295 filed Jul. 4, 2006.

TECHNICAL FIELD

The present invention relates a device and method for continuously variable transmission in which a pump/pumps and a variable capacity motor/motors form a closed circuit.

BACKGROUND ART

Conventional HST (Hydrostatic Transmission) devices capable of continuously variable transmission use a hydraulic pump and a hydraulic motor. As such HST devices, an HST circuit structure (e.g., Patent Document 1), as shown in FIG. 14, are known.

As an HST device that uses one hydraulic pump and one hydraulic motor, an HST device (e.g., Patent Document 2), as shown in FIG. 16, has been proposed in which continuously variable transmission is retained during low speed running, while the hydraulic motor can be directly connected to a power source during high speed running.

In the HST circuit structure shown in FIG. 14, a variable capacity pump 50 driven by a drive source such as an engine (not shown) is connected to a fixed capacity motor 51 and a variable capacity motor 52 via circuits 59 and 60.

A gear 54 is fitted to the motor shaft 52a of the variable capacity motor 52. The gear 54 meshes with a gear 56 fitted to an output shaft 53 via a clutch 55. A gear 57 is fitted to the motor shaft 51a of the fixed capacity motor 51, and meshes with a gear 58 fitted to the output shaft 53. Rotation of the output shaft 53 rotates the tires or the like of a vehicle (not shown).

The HST device described in the Patent Document 2 has a circuit structure as shown in FIG. 16. An engine 79 drives a variable capacity pump 61. The variable capacity pump 61 and a hydraulic motor 63 form a closed circuit via oil conduits 62 and 64. The hydraulic motor 63 has an output shaft that causes a vehicle to run, and is connected to the variable capacity pump 61 via a shaft 65 to which a clutch mechanism 66 is fitted.

Normally, the clutch mechanism 66 is disconnected, in which position the hydraulic motor 63 is disconnected from the variable capacity pump 61. When the clutch mechanism 66 is connected, it connects the hydraulic motor 63 to the variable capacity pump 61. This makes it possible to directly transmit the drive force of the engine 79 to the output shaft of the hydraulic motor 63 via the shaft 65.

The clutch mechanism 66 is operated by the cylinder 67. Until the pressure in the rod-side chamber 67a of the cylinder 67 is higher by a predetermined degree than that in the bottom chamber 67b, the clutch mechanism 66 remains disengaged and the hydraulic motor 63 is disconnected from the variable capacity pump 61. When the pressure in the rod-side chamber 67a of the cylinder 67 is higher by a predetermined degree than that in the bottom chamber 67b, the thrust of the cylinder 67 engages the clutch mechanism 66, thereby connecting the output shaft of the hydraulic motor 63 to the variable capacity pump 61.

When the vehicle is running forward, the bottom chamber 67b of the cylinder 67 is supplied with pressure by a first control pump 68 connected to the variable capacity pump 61, and the rod-side chamber 67a of the cylinder 67 is supplied with pressure by a second control pump 70 connected to the hydraulic motor 63.

Further, a communication line 72, by which the oil conduits 62 and 64 communicate, is disposed via a communication valve 73. The communication valve 73 kept in a normal position by a spring 78 is in a disconnected position which blocks the communication line 72. When the solenoid 74 is excited, the communication valve 73 switches to the communicating position which activates the communication line 72. The solenoid 74 is connected to the switch 75 engaged with the swash plate of the variable capacity pump 61.

When the swash plate of the variable capacity pump 61 is inclined to a set angle within the forward running range of the vehicle, the switch 75 detects the inclination, thereby exciting the solenoid 74. Specifically, the switch 75 excites the solenoid 74 when the vehicle is running forward at high speed such that the set angle approaches the maximum in the forward running range of the vehicle, specifically, substantially when the flow rate of pressure oil delivered by the variable capacity pump 61 is at its maximum.

When the degree of inclination of the swash plate of the variable capacity pump 61 is included, from zero to the set angle, the number of revolutions of the hydraulic motor 63 can be controlled by the quantity of pressure oil delivered by the variable capacity pump 61. This makes it possible, by continuously variable transmission, to increase the speed of the vehicle.

At this time, the quantity of pressure oil delivered by the variable capacity pump 61 is less than the capacity of the hydraulic motor 63. This means that the variable capacity pump 61 must be rotated more than once in order for the hydraulic motor 63 to make one rotation.

This results in a difference between the number of revolutions of the first control pump 68 and of those of the second control pump 70, with the result that the first control pump 68 delivers more pressure oil than the second control pump 70 by a quantity corresponding to the difference in the number of revolutions. This prevents pressure in the rod-side chamber 67a of the cylinder 67 from becoming higher than that in the bottom chamber 67b by a predetermined pressure. This makes it possible to keep the clutch mechanism 66 disengaged.

When the swash plate of the variable capacity pump 61 is inclined to the maximum angle, the flow rate of pressure oil delivered by the variable capacity pump 61 matches that of the capacity of the hydraulic motor 63. In other words, the number of revolutions of the first control pump 68 is equal to that of the second control pump 70, so the first and second control pumps 68 and 70, each having the same capacity, deliver the same quantities of pressure oil.

The degree of the opening of a second orifice 71 located upstream of the rod-side chamber 67a of the cylinder 67 is smaller than that of the opening of a first orifice 69 located upstream of the bottom chamber 67b of the cylinder 67. Accordingly, pressure in the rod-side chamber 67a of the cylinder 67 exceeds that in the bottom chamber 67b by a predetermined pressure, thereby switching the clutch mechanism 66 to the engaged position.

This enables the hydraulic motor 63 to connect to the variable capacity pump 61. At this point, the switch 75 determines that the swash plate of the variable capacity pump 61 has been inclined to the set angle. In response to a signal from the switch 75, the solenoid 74 is excited and the communication valve 73 is switched to the communicating position.

When the swash plate of the variable capacity pump 61 is inclined to the maximum angle, the clutch mechanism 66 can be switched to the engaged position. Accordingly, the drive force of the engine 79 can be directly transmitted to the hydraulic motor 63 via the shaft 65.

Patent Document 1: Japanese Patent Application Laid-Open 2-240442

Patent Document 2: Japanese Patent Application Laid-Open

DISCLOSURE OF THE INVENTION

Problems to be Solved by the Invention

The HST device makes it possible to accelerate a vehicle from zero to a predetermined speed by continuously variable transmission. However, in the conventional HST devices described in the patent Documents 1 and 2, a gear change ratio obtained by the continuously variable transmission is about three to four times greater where a single hydraulic pump and a single hydraulic motor are used. Even where one hydraulic pump and two hydraulic motors are used, the gear change ratio obtained by continuously variable transmission is only about six to eight times greater.

In order to obtain a gear change ratio greater than those, a mechanical transmission device must be added and a gear change by the HST device and a gear change by the mechanical transmission device must be carried out in two steps. However, adding the mechanical transmission device requires another space. It has been difficult to make space for such a mechanical transmission device in a vehicle.

Also, in the mechanical transmission device, output torque must be stopped once by a clutch in order to switch a gear change ratio. This results in a so-called no-torque phenomenon in which no output torque is transmitted to tires when the gear change of the mechanical transmission takes place.

For example, switching gear change ratio of the mechanical transmission device while a vehicle running up a hill may temporarily decrease the speed of the vehicle. Accordingly, the mechanical transmission may cause a gear change shock and hence discomfort in ride.

It is, accordingly, an object of the invention to provide a device and method for continuously variable transmission capable of increasing the gear change ratio for continuously variable transmission as by the HST device. Incidentally, the term "equivalent capacity" used in this invention is defined as the product of the maximum capacity of the variable capacity motor and a gear change ratio assigned to the output shaft of the variable capacity motor.

Means for Solving the Problems

The object of the invention can be achieved by the aspects of the invention descried in claims 1 to 4.

That is, the most significant main features reside in a first aspect of the invention, according to which there is provided a device for continuously variable transmission, comprising a plurality of variable capacity motors connected together such that the variable capacity motors form a closed circuit together with a pump, the device being characterized in that: a motor shaft provided for each of the variable capacity motors and an output shaft for extracting rotation are connected via speed change gears of plural gear change ratios, the speed change gears being able to be connected or disconnected and selected; and the gear change ratios of the speed change gears are set for different variable capacity motors respectively in descending order of equivalent capacities thereof so that one selected from the equivalent capacities of one of the variable capacity motors is assigned as a maximum equivalent capacity, a second maximum equivalent capacity is assigned as one of the equivalent capacities of another one of the variable capacity motors, and a third maximum equivalent capacity is assigned as one of the equivalent capacities of still another one of the variable capacity motors.

Other most significant main features reside in a second aspect of the invention, according to which there is provided a device for continuously variable transmission, comprising a variable capacity motor and a variable capacity pump/motor connected together such that the variable capacity motor and the variable capacity pump/motor form a closed circuit together with a pump, the device being characterized in that: a motor shaft provided for the variable capacity motor and an output shaft for extracting rotation are connected via speed change gears of plural gear change ratios, the speed change gears being able to be connected or disconnected and selected; a motor shaft provided for the variable capacity pump/motor and the output shaft are connected via a speed change gear, the speed change gear being able to be connected or disconnected; the motor shaft of the variable capacity pump/motor and a pump drive shaft provided for the pump are connected via a speed change gear, the speed change gear being able be connected or disconnected; and the gear ratios of the speed change gears fitted to the motor shaft of the variable capacity motor, the motor shafts of the variable capacity pump/motor, and the output shaft are set in descending order of equivalent capacity such that one equivalent capacity selected from equivalent capacities of the variable capacity motor is assigned as a maximum equivalent capacity, a second maximum equivalent capacity is assigned as an equivalent capacity of the variable capacity pump/motor, and a third maximum equivalent capacity is assigned as still another equivalent capacity of the variable capacity motor.

Further, the respective most significant main features of third and fourth aspects of this invention are characterized by a method for continuously variable transmission using the device for continuously variable transmission according to the first and second aspects.

EFFECT OF THE INVENTION

This invention achieves continuously variable transmission for the output shaft of a device for continuously variable transmission by advantageously utilizing the high efficiencies of a pump, and variable capacity motors together with the variable capacity pump/motor constituting the continuously variable transmission device. In addition, adopting equivalent capacity allows a wide range of continuously variable transmission for the output shaft.

In addition, continuously variable transmission control using a plurality of variable capacity motors or continuously variable transmission control using a variable capacity motor and a variable capacity pump/motor allows a wide range of continuously variable transmission. In addition, a high gear change ratio can be ensured without resulting in moment at which no torque is applied when a gear change takes place.

BRIEF DESCRIPTION OF THE DRAWINGS

FIG. 12 is a table showing capacity efficiencies corresponding to FIG. 8 (comparative example).

FIG. 13 is a table showing capacity efficiencies corresponding to FIG. 9 (present embodiment).

EXPLANATIONS OF REFERENCE NUMERALS

Figure 1:
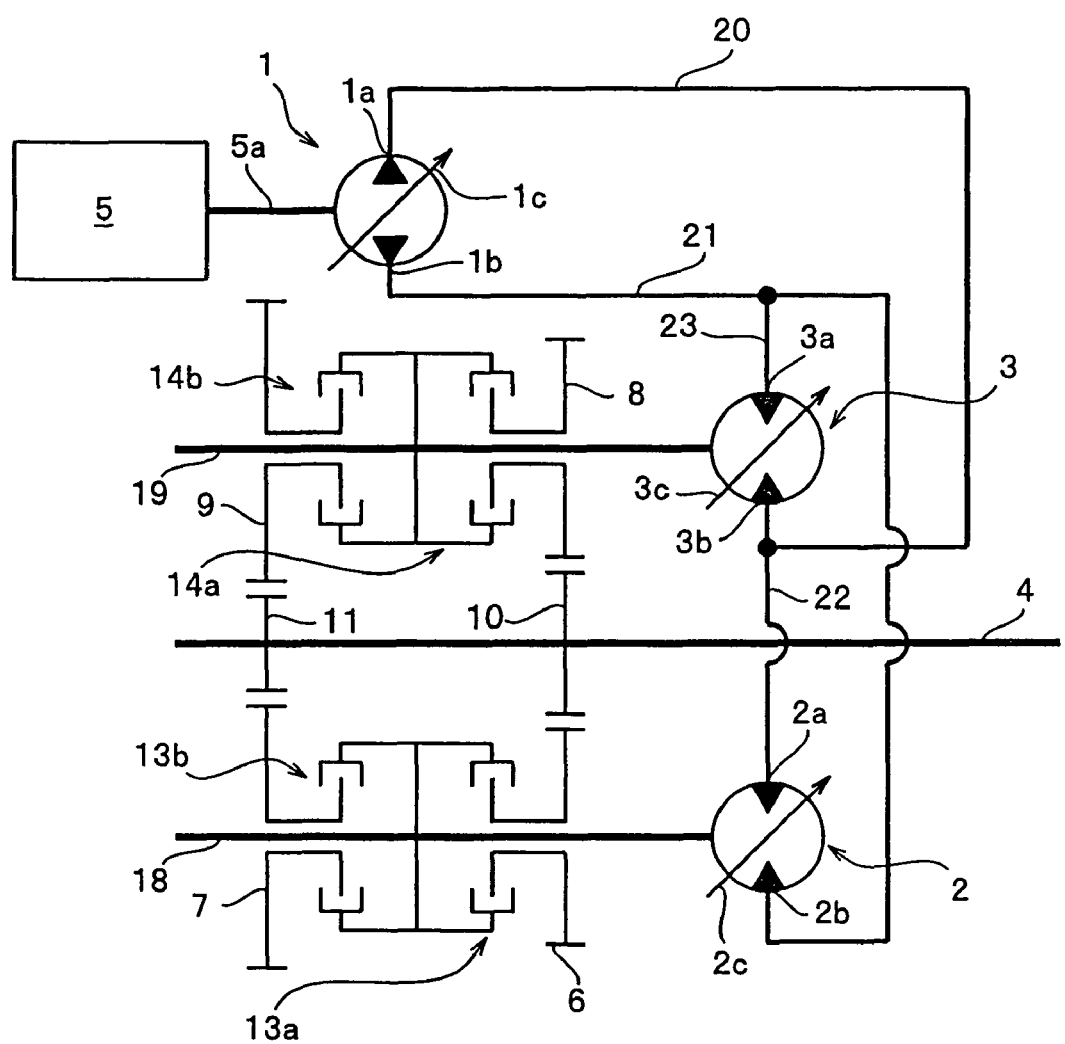
FIG. 1 is a diagram schematically showing the configuration of a circuit of an HST device (first embodiment).

1 VARIABLE CAPACITY PUMP
2 VARIABLE CAPACITY MOTOR
3 VARIABLE CAPACITY MOTOR
6 FIRST DRIVE GEAR
7 SECOND DRIVE GEAR
8 THIRD DRIVE GEAR
9 FOURTH DRIVE GEAR
10 FIRST DRIVEN GEAR
11 SECOND DRIVEN GEAR
33 VARIABLE CAPACITY PUMP/MOTOR
50 VARIABLE CAPACITY PUMP
51 FIXED CAPACITY MOTOR
52 VARIABLE CAPACITY MOTOR
53 VARIABLE CAPACITY PUMP
62 HYDRAULIC MOTOR
66 CLUTCH MECHANISM
68 FIRST CONTROL MECHANISM
70 SECOND CONTROL PUMP
73 COMMUNICATION VALVE
P1 TO P4 VARIABLE CAPACITY MOTOR

BEST MODE FOR CARRYING OUT THE INVENTION

Referring to the accompanying drawings, a detailed description of preferred embodiments of the invention will now be given. The configuration of a continuously variable transmission device of the invention will be described exemplifying the continuously variable transmission device of an HST device.

However, as well as the form and configuration described below, the continuously variable transmission device and method according to this invention may adopt any form and configuration that accomplish the purpose of the invention.

Therefore, the invention is not limited to the embodiments discussed below and may be used as appropriate in any continuously variable transmission device as well as HST devices.

First Embodiment

A continuously variable transmission device according to the first embodiment of the invention using, for example, a variable capacity pump 1 and two variable capacity motors 2 and 3 will be described with reference to FIG. 1. This invention can also be used for a fixed capacity pump as well as for a variable capacity pump and is not limited to variable capacity pumps.

Additionally, the number of variable capacity motors composing the continuously variable transmission device is not limited to two but may be more than two. Further, the number of variable speed gears interposed between one motor shaft and a corresponding output shaft is not limited to two, such as one being a drive gear and the other a driven gear, as shown in FIG. 1, but may be more than two.

The variable capacity pump 1 is directly connected to an engine 5 via a pump drive shaft 5a and driven by the rotation of the engine 5. Between the variable capacity motor 2 and the variable capacity pump 1 is a closed circuit formed from oil conduits 20, 22, and 21. Between the variable capacity motor 3 and the variable capacity pump 1 is another closed circuit formed from oil conduits 20, 22 and 21 and an oil conduit 23 branching from the oil conduit 21.

In other words, a port 1a in the variable capacity pump 1 communicates with ports 2a and 3b in the variable capacity motors 2 and 3 respectively. Likewise, a port 1b in the variable capacity pump 1 communicates with ports 2b and 3a in the variable capacity motors 2 and 3 respectively.

Next, a description is given of the case where pressure oil is delivered to the oil conduit 20 from the port 1a of the variable capacity pump 1. The pressure oil delivered to the oil conduit 20 flows from the port 2a of the variable capacity motor 2 and causes the rotation of variable capacity motor 2. Rotation output from the variable capacity motor 2 can be transmitted by a motor shaft 18.

Similarly, pressure oil delivered to the oil conduit 20 flows from the port 3b of the variable capacity motor 3 and causes the rotation of the variable capacity motor 3. Rotation output from the variable capacity motor 3 can be transmitted by a motor shaft 19. At this time, the variable capacity motors 2 and 3 are rotated in the same direction.

The pressure oil discharged from the port 2b of the variable capacity motor 2 and the pressure oil discharged from the port 2a of the variable capacity motor 2 are returned to the port 1b of the variable capacity pump 1 via the oil conduit 21.

In the case where pressure oil is delivered to the oil conduit 21 from the port 1b of the variable capacity pump 1, the variable capacity motors 2 and 3 are activated in the same way as in the case where the pressure oil is delivered to the oil conduit 20 from the port 1a of the variable capacity pump 1, except that the rotating directions of the variable capacity motors 2 and 3 are opposite to those in that case.

That is, when pressure oil is delivered to the oil conduit 21 from the port 1b of the variable capacity pump 1, the ports 2b and 3a of the variable capacity motors 2 and 3 respectively serve as the respective input ports, and the ports 2a and 3b as the respective output ports of the variable capacity motors 2 and 3.

The motor shafts 18 and 19 that transmit rotation outputs from the variable capacity motors 2 and 3 respectively are parallel to an output shaft 4 that outputs drive force to a vehicle.

A first drive gear 6 and second drive gear 7 are fitted to the motor shaft 18 of the variable capacity motor 2 via clutches 13a and 13b respectively. A third drive gear 8 and fourth groove gear 9 are fitted to the motor shaft 19 of the variable capacity motor 3 via clutches 14a and 14b respectively.

The first and third drive gears 6 and 8 mesh with a first driven gear 10 fitted to the output shaft 4. Likewise, the second and fourth drive gears 7 and 9 mesh with a second driven gear 11 fitted to the output shaft 4.

Specifically, switching between the clutches 13a and 13b allows transmission of the rotation of the motor shaft 18 to the output shaft 4 from the first drive gear 6 via the first driven gear 10, or from the second drive gear 7 via the second driven gear 11. Likewise, switching between the clutches 14a and 14b allows transmission of the rotation of the motor shaft 19 to the output shaft 4 from the third drive gear 8 via the first driven gear 10, or from the fourth drive gear 9 via the second driven gear 11.

Combining the drive gears and the driven gears as appropriate in this manner makes it possible to switch to a different gear change ratio and hence to allow gear change control carried out in two or more steps from the motor shaft 18 to the output shaft 4 and from the motor shaft 19 to the output shaft 4.

In order to allow gear change in two or more steps, the drive gears may configured such that a clutch is disposed for each group of gears, and rotation transmitted by groups of gears can be extracted by one of the drive gears by connecting or disconnecting the clutches. The one drive gear can be meshed with the driven gear fitted to the output shaft. Each group of gears can be composed of, for example, a planetary gear mechanism and a combination of gears of different speed reduction ratios.

An equivalent capacity can be calculated as a value obtained by multiplying the maximum capacity of each variable capacity motor by a gear change ratio. The value of the gear change ratio of each speed change gear can be set by a combination of a drive gear and a driven gear meshing with each other between the motor shaft 18 or 19 and the output shaft 4. The maximum capacity of a variable capacity motor is inevitably determined by the capacity that is greatest of all the capacities of the variable capacity motor to be used.

For example, if the rotation of the motor shaft 18 is transmitted to the output shaft 4 via the first drive gear 6 and first driven gear 10, the equivalent capacity of the variable capacity motor 2 is a value obtained by multiplying a gear change ratio of the first drive gear 6 to the first driven gear 10 by the maximum capacity of the variable capacity motor 2.

The maximum equivalent capacity of the variable capacity motor 2 obtained by the speed change gear composed of a combination of the first drive gear 6 and first driven gear 10 is the maximum equivalent capacity. The next maximum equivalent capacity is the equivalent capacity of the variable capacity motor 3 obtained by a speed change gear composed of a combination of the third drive gear 8 and first driven gear 10.

The other equivalent capacities in descending order are the equivalent capacity of the variable capacity motor 2 composed of a combination of the second drive gear 7 and second driven gear 11 and the equivalent capacity of the variable capacity motor 3 composed of a combination of the fourth drive gear 9 and second driven gear 11. The order of equivalent capacity is not limited to the foregoing order of speed change gear but may be another order of speed change gear.

As to the order of equivalent capacities, in the case where one of the equivalent capacities of the variable capacity motor 2 is set as the maximum equivalent capacity, it is necessary that the second maximum equivalent capacity be one of the equivalent capacities of the variable capacity motor 3.

Further, it is necessary that the variable capacity motors 2 and 3 are so constructed that the third maximum equivalent capacity be the other of the equivalent capacities of the variable capacity motor 2, and the fourth maximum equivalent capacity the other of the equivalent capacities of the variable capacity motor 3.

Next, referring to FIG. 2, a control pattern for the continuously variable transmission device as shown in FIG. 1 will be discussed.

Figure 2:
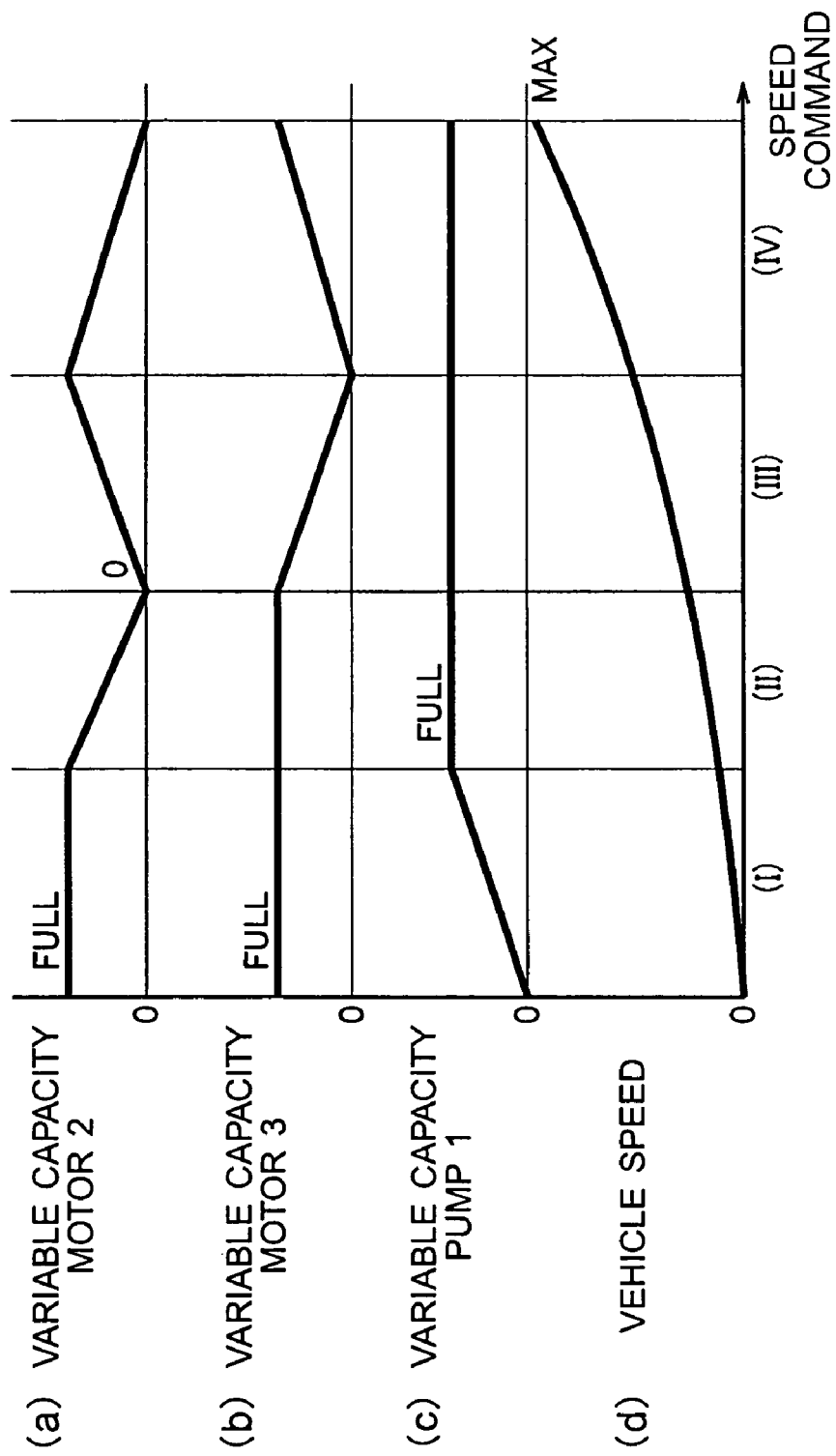
FIG. 2 is a control pattern for the configuration of the circuit of the HST device shown in FIG. 1 (first embodiment).

The horizontal axes of graphs in FIGS. 2(*a*), 2(*b*) and 2(*c*) corresponding to the variable capacity motor 2, variable capacity motor 3, and variable capacity pump 1 respectively indicate command values obtained by converting the capacities of the variable capacity motor 2, variable capacity motor 3, and the variable capacity pump 1 into capacities matching corresponding speed command values. The command values can be determined from the speed command values.

The horizontal axis of a graph in FIG. 2(*d*) corresponding to vehicle speed indicates a speed command value, the examples of which include the degree of operation of an operating lever for speed adjustment, and the number of revolutions of the engine 5.

The vertical axis of the graph in FIG. 2(*a*) indicates the capacity of the variable capacity motor 2; that in FIG. 2(*b*), the capacity of the variable capacity motor 3; that in FIG. 2(*c*), the capacity of the variable capacity pump 1; that in FIG. 2(*d*), the speed of a vehicle. In FIG. 1, if the speed of the vehicle is zero (i.e., the vehicle is stationary), specifically if the angle of the swash plate of the variable capacity pump 1 is zero, the angles of swash plates for the variable capacity motors 2 and 3 are maximum.

At this time, in relation to a vehicle speed command of zero, the capacities of the variable capacity motors 2 and 3 are maximum and the capacity of the viable capacity pump 1 is zero, as shown in FIGS. 2(*a*) to (*c*).

As the speed increases according to a command during interval (I) in FIG. 2, the capacity of the variable capacity pump 1 is increased from zero to the maximum, as shown in FIG. 2(*c*). Meanwhile, the capacities of the variable capacity motors 2 and 3 are kept maximum, as shown in FIGS. 2(*a*) and 2(*b*).

As the capacity of the variable capacity pump 1 increases to the maximum capacity from zero, the rates of flow from the variable capacity pump 1 to the variable capacity motors 2 and 3, the capacity of which have been kept maximum, increase. This increases the number of revolutions of the variable capacity motors 2 and 3 and hence the number of revolutions of the output shaft 4 (shown in FIG. 1). In other words, the speed of the running vehicle increases from zero, as shown in FIG. 2(*d*).

As the speed increases according to the command during interval (II), the capacity of the variable capacity motor 2 is decreased to zero from the maximum as shown in FIG. 2(*a*). Meanwhile, the capacities of the variable capacity motor 3 and variable capacity motor pump 1 are kept maximum, as shown in FIGS. 2(*b*) and 2(*c*).

Thus, as the capacity of the variable capacity motor 2 decreases, the number of revolutions of the motor 2 increases, so that the number of revolutions of the motor shaft 18 (shown in FIG. 1) and hence the rotation of the output shaft 4 increase. In other words, the speed of the running vehicle further increases, as shown in FIG. 2 (*d*). At this time, the number of revolutions of the variable capacity motor 3 increases with the number of revolutions of the variable capacity motor 2.

During interval (III) in FIG. 2, the capacity of the variable capacity motor 2, after the decrease in the equivalent capacity thereof, is increased from zero to the maximum as the speed is increased according to the command, as shown in FIG. 2(a). Simultaneously with this, the capacity of the variable capacity motor 3 retaining the equivalent capacity greater than that of the variable capacity motor 2 is decreased to zero from the maximum, as shown in FIG. 2(b). Meanwhile, the capacity of the variable capacity pump 1 is kept maximum, as shown in FIG. 2(c).

Thus, as the capacity of the variable capacity motor 3 decreases, the number of revolutions of the variable capacity motor 3 and hence the number of revolutions of the motor shaft 19 (shown in FIG. 1) increase. This increase in the number of revolutions of the motor shaft 19 further increases the number of revolutions of the output shaft 4 and hence the speed of the running vehicle, as shown in FIG. 2(d). At this time, the number of revolutions of the variable capacity motor 2 increases with the number of revolutions of the variable capacity motor 3.

During interval (IV) in FIG. 2, the capacity of the variable capacity motor 3, after the decrease in the equivalent capacity thereof, is increased from zero to the maximum as the speed is increased according to the command, as shown in FIG. 2(b). Simultaneously with this, the capacity of the variable capacity motor 2 retaining the equivalent capacity greater than that of the variable capacity motor 3 is decreased to zero from the maximum, as shown in FIG. 2(a). Meanwhile, the capacity of the variable capacity pump 1 is kept maximum, as shown in FIG. 2(c).

Thus, as the capacity of the variable capacity motor 2 decreases, the number of revolutions of the variable capacity motor 2 and hence the number of revolutions of the motor shaft 18 (shown in FIG. 1) increase. This increase in the number of revolutions of the motor shaft 18 further increases the number of revolutions of the output shaft 4, and hence the speed of the running vehicle, as shown in FIG. 2(d), thus keeping the vehicle speed maximum. At this time, the number of revolutions of the variable capacity motor 3 increases with the number of revolutions of the variable capacity motor 2.

Next, a control flow, showing the procedure for controlling the continuously variable transmission device, will be explained with reference to FIG. 3.

In step 1, the angle of a swash plate 1c for the variable capacity pump 1 shown in FIG. 1 is increased, thereby increasing the capacity of the variable capacity pump 1 from zero to the maximum. A description will now be given, assuming that at this time pressure oil is delivered to the oil conduit 20 from the variable capacity pump 1.

Since the angles of the swash plates of the variable capacity motors 2 and 3 are kept maximum, the rotations of the variable capacity motors 2 and 3 are controlled by the flow rate of pressure oil supplied from the oil conduit 20.

Rotation output from the variable capacity motor 2 is transmitted to the first driven gear 10 from the first drive gear 6 via the motor shaft 18, thereby rotating the output shaft 4. Simultaneously with this, rotation output from the variable capacity motor 3 is transmitted to the third drive gear 8 and the first driven gear 10 via the motor shaft 19, thereby rotating the output shaft 4.

As a result, the output shaft 4 is driven by the resultant force of the rotation outputs from the variable capacity motors 2 and 3 rotating in the same directions. This makes it possible to output the high torque required to cause the engine to start running.

As shown in FIG. 2(c), the capacity of the variable capacity pump 1 increases to the maximum from zero. In addition, as shown in FIGS. 2(a) and 2(c), the variable capacity motors 2 and 3 maintain their maximum capacities. As shown in FIG. 2(d), the speed of the vehicle increases from zero due to the rotation outputs from the variable capacity motors 2 and 3.

In step 2, a determination is made whether the variable capacity pump 1 has reached the maximum capacity. If the variable capacity pump 1 has not reached the maximum capacity, the capacity of the variable capacity pump 1 is increased. This condition corresponds to the above-described interval (I) in FIG. 2. When the capacity of the variable capacity pump 1 has reached the maximum, the flow proceeds to step 3.

Figure 3:
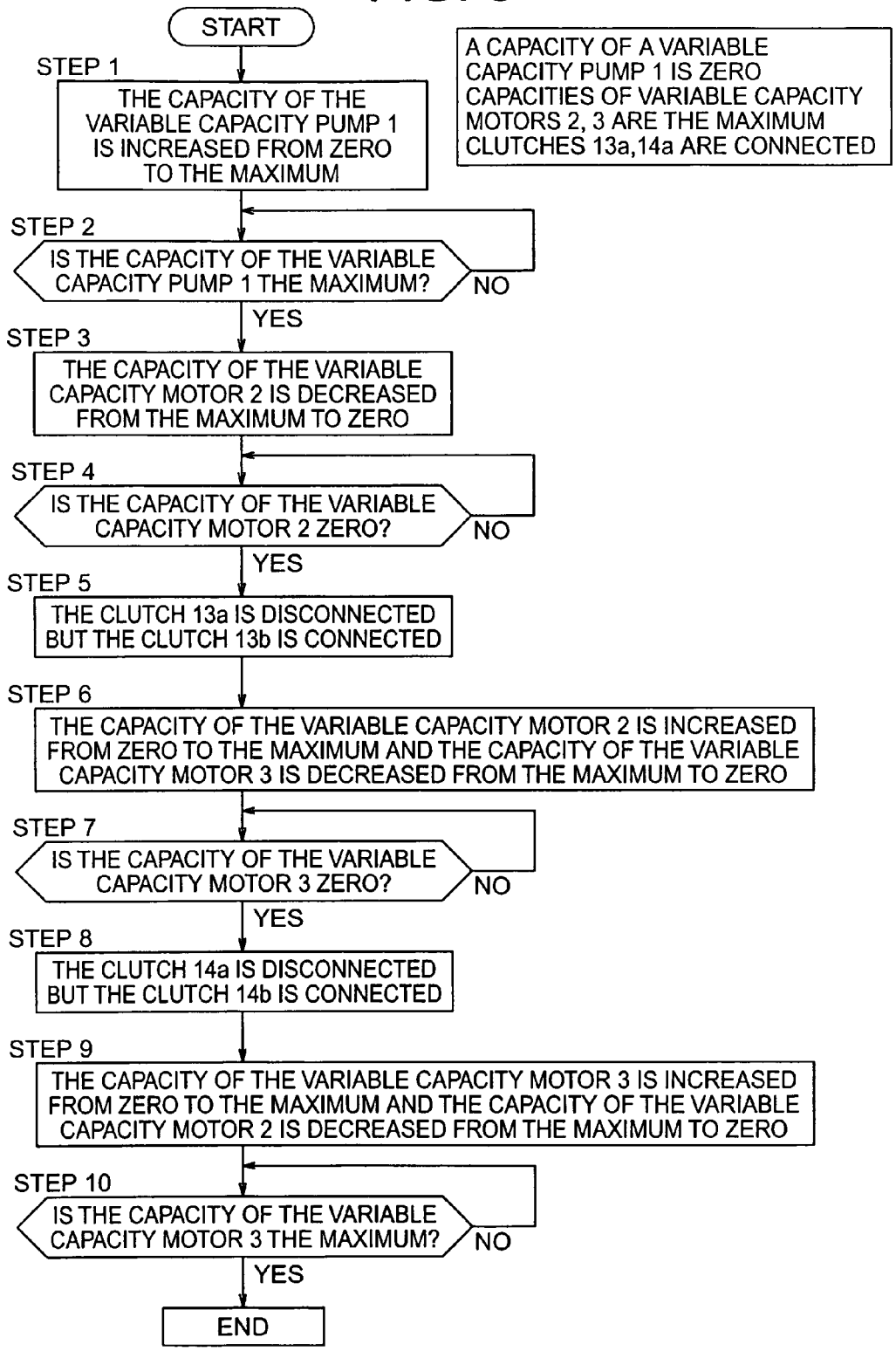
FIG. 3 is a control flow corresponding to FIG. 1 (first embodiment).

In step 3 in FIG. 3, control is exerted so that the angle of the swash plate 2c of the variable capacity motor 2 is changed from the maximum to zero. Until this point, the flow rate of pressure oil delivered from the variable capacity pump 1 to the oil conduit 20 has been constant. However, decreasing the angle of the swash plate 2c of the variable capacity motor 2 to zero from the maximum can increase the rotation output of the variable capacity motor 2.

When the rotation output of the variable capacity motor 2 increases, rotation output transmitted from the first drive gear 6 to the first driven gear 10 via the motor shaft 18 increases, so that the output shaft 4 rotates at a higher speed. Consequently, the running vehicle further accelerates. In addition, as the capacity of the variable capacity motor 2 decreases, the flow rate of pressure oil flowing to the variable capacity motor 3 from the oil conduit 20 increases.

Further, the motor shaft 19 of the variable capacity motor 3 is connected to the output shaft 4 via the first driven gear 10 and third drive gear 8. Accordingly, the motor shaft 19 is rotated at a number of revolutions matching the higher speed at which the output shaft 4 is rotating.

As shown in FIG. 2(a), the capacity of the variable capacity motor 2 decreases from the maximum to zero. The variable capacity motor 3 and the variable capacity pump 1 retain their maximum capacities, as shown in FIGS. 2(b) and 2(c). Consequently, the running vehicle further accelerates, as shown in FIG. 2(d).

In step 4 in FIG. 3, a determination is made whether the capacity of the variable capacity motor 2 has reached zero or not. If the capacity of the variable capacity motor 2 has not reached zero, the capacity of the variable capacity motor 2 is decreased. This condition corresponds to interval (II) in FIG. 2. When the capacity of the variable capacity motor 2 has reached zero, the flow proceeds to step 5.

In step 5 in FIG. 3, a clutch 13a is disconnected but the clutch 13b is connected. To be specific, the motor shaft 18 is connected to the output shaft 4 via the second drive gear 7 and second driven gear 11. At this time, the gear change ratio assigned to the motor shaft 18 is switched. However, since the capacity of the variable capacity motor 2 is zero, no output torque is transmitted. This prevents transmission shock when the gear change ratio assigned to the motor shaft 18 is switched.

In addition, when the gear change ratio assigned to the motor shaft 18 is switched, the variable capacity motor 3 transmits the rotation to the output shaft 4 via the third drive gear 8 and first driven gear 10. This prevents such an occurrence that no torque is applied to the output shaft 4.

In step 6 in FIG. 3, the gear change ratio assigned to the motor shaft 18 of the variable capacity motor 2 is switched so that the rotation output of the motor shaft 18 can be transmitted from the second drive gear 7 to the second driven gear 11. Thereafter, the capacity of the variable capacity motor 3 is decreased to zero from the maximum. Simultaneously with this, the capacity of the variable capacity motor 2 is increased to the maximum from zero.

Until this point, the flow rate of the pressure oil delivered to the oil conduit 20 from the variable capacity pump 1 has been constant. However, decreasing the angle of the swash plate 3c for the variable capacity motor 3 to zero from the maximum can increase the rotation output from the variable capacity motor 3.

The output shaft 4 is rotated by virtue of a difference between the rotation output of the variable capacity motor 3 and the rotation output of the variable capacity motor 2. At this point, since the rotation output of the motor 3 is greater than that of the motor 2, the rotation of the output shaft 4 further increases.

That is, in terms of equivalent capacity, the variable capacity motor 3 is greater than the variable capacity motor 2. Accordingly, the rotation output of the motor 3 becomes greater than that of the motor 2. Thus, the running vehicle further accelerates.

As shown in FIG. 2(a), the capacity of the variable capacity motor 2 increases to the maximum from zero. As shown in FIG. 2(b), the capacity of the variable capacity motor 3 decreases from the maximum to zero. As shown in FIG. 2(c), the variable capacity pump 1 retains the maximum capacity. As shown in FIG. 2(d), the speed of the running vehicle becomes higher.

In step 7 in FIG. 3, a determination is made whether the capacity of the variable capacity motor 3 has reached zero or not. If the capacity of the variable capacity motor 3 has not reached zero, the capacity of the variable capacity motor 3 is decreased. This condition corresponds to interval (III) in FIG. 2. When the capacity of the motor 3 has reached zero, the flow proceeds to step 8.

In step 8 in FIG. 3, the clutch 14a is disconnected but the clutch 14b is connected. In other words, the motor shaft 19 is connected to the output shaft 4 via the fourth drive gear 9 and second driven gear 11. At this time, the gear change ratio assigned to the motor shaft 19 is switched. However, since the capacity of the variable capacity motor 3 is zero, no output torque is transmitted. This prevents transmission shock when the gear change ratio assigned to the motor shaft 19 is switched.

Even when the gear change ratio assigned to the motor shaft 19 is switched, the variable capacity motor 2, which has been operating at maximum capacity, is rotated by virtue of the flow rate of pressure oil pumped from the variable capacity motor 1, and transmits the rotation to the output shaft 4 via the second drive gear 7 and second driven gear 11. This prevents moment at which no torque is applied to the output shaft 4.

In step 9 in FIG. 3, the gear change ratio assigned to the motor shaft 19 of the variable capacity motor 3 is switched so that rotation output from the motor shaft 19 can be transmitted from the fourth drive gear 9 to the second driven gear 11. Thereafter, the capacity of the variable capacity motor 2 is decreased to zero from the maximum. Simultaneously with this, the capacity of the variable capacity motor 3 is increased to the maximum from zero.

Until this point, the flow rate of the pressure oil delivered to the oil conduit 20 from the variable capacity pump 1 has been constant. However, decreasing the angle of the swash plate 2c of the variable capacity motor 2 to zero from the maximum can increase the rotation output of the variable capacity motor 2.

Also, the output shaft 4 is rotated by virtue of a difference between the rotation output of the variable capacity motor 2 and rotation output of the variable capacity motor 3. Further, since the rotation output of the motor 2 is greater than that of the motor 3, the rotation of the output shaft 4 further increases.

In other words, in terms of equivalent capacity, the variable capacity motor 2 is greater than the variable capacity motor 3. Accordingly, the rotation output of the motor 2 becomes greater than that of the motor 3. Thus, the running vehicle further accelerates.

As shown in FIG. 2(a), the capacity of the variable capacity motor 2 decreases to zero from the maximum. As shown in FIG. 2(b), the capacity of the variable capacity motor 3 increases to the maximum from zero. As shown in FIG. 2(c), the capacity of the variable capacity pump 1 retains the maximum capacity. As shown in FIG. 2(d), the speed of the running vehicle becomes higher.

In step 10 in FIG. 3, it is determined whether the capacity of the variable capacity motor 3 has reached the maximum. If the capacity of the variable capacity motor 3 has not reached the maximum, the capacity of the motor 3 is increased. This condition corresponds to interval (IV) in FIG. 2. When the capacity of the motor 3 has reached the maximum, the control is terminated.

Further steps in the control pattern and control flow are not described in FIGS. 2 and 3. However, the following steps can be taken: after the capacity of the variable capacity motor 2 is decreased to zero and that of the variable capacity motor 3 is increased to the maximum, the clutch 13b is disconnected, thereby keeping the capacity of the variable capacity motor 2 at zero and applying no loads thereto. From this condition, the capacity of the variable capacity motor 3 is decreased from the maximum to a half, for example. This makes it possible to further accelerate the running vehicle.

This realizes the continuously variable transmission device in which a gear change ratio is greatly increased. Furthermore, the gear change ratio is switched from the clutch 13a to the clutch 13b or from the clutch 14a to the clutch 14b while the rotation output from the variable capacity motor 3 or 2 retaining the maximum capacity has been transmitted to the output shaft 4. This prevents moment at which no torque is applied when the gear change ratio is switched.

Accordingly, this prevents moment at which no torque is applied even when the clutch (i.e., the gear change ratio) is switched while the vehicle is running up a hill. Further, switching the gear change ratio when the capacity of the variable capacity motor is zero prevents transmission shock.

FIG. 1 exemplifies the case where two variable capacity motors, 2 and 3, are used. However, this invention does not limit the number of variable capacity motors to two, but also ensures efficient function even where more than two variable capacity motors are used.

Where a plurality of variable capacity motors are disposed, the equivalent capacities of the different variable capacity motors are set in descending order, each equivalent capacity being obtained from a gear change ratio which each variable capacity motor can select.

A concrete example is given of a case where three variable capacity motors, A, B, and C, are used. Two different equivalent capacities are set for each of the variable capacity motors A to C according to a gear change ratio in assigned to a corresponding speed change gear.

For example, one of the two equivalent capacities of the variable capacity motor A is assigned as the maximum equivalent capacity A1. One of the two equivalent capacities of the variable capacity motor B is assigned as a second maximum equivalent capacity B1. One of the two equivalent capacities of the variable capacity motor C is assigned as a third maximum equivalent capacity C1.

The gear change ratios of the speed change gears are set so that the other equivalent capacity A2 of the variable capacity motor A, the other equivalent capacity B2 of the variable capacity motor B, and the other equivalent capacity C2 of the variable capacity motor C decrease in that order. This order of equivalent capacity is just an example and is not limited thereto.

First, control is exerted such that the capacity of the variable capacity motor A with the equivalent capacity A1 is decreased to zero. The gear change ratio of the variable capacity motor A, the capacity of which has decreased to zero, is switched to decrease the equivalent capacity. Specifically, the equivalent capacity of the variable capacity motor A can be switched to the other equivalent capacity A2 in terms of maximum capacity.

Next, the capacity of the variable capacity motor B with the equivalent capacity B1 is decreased to zero. Simultaneously with this, the variable capacity motor A, the capacity of which has been zero, is increased to the maximum capacity so as to acquire the equivalent capacity A2.

Subsequently, the gear change ratio of the variable capacity motor B, the capacity of which has reached zero, is switched to acquire the other equivalent capacity B2. Then, the capacity of the variable capacity motor C with the equivalent capacity C1 is decreased to zero. Simultaneously with this, the variable capacity motor B, the capacity of which has been zero, is increased to the maximum capacity, thereby switching to the equivalent capacity B2.

Further, the gear change ratio of the variable capacity motor C, the capacity of which has decreased to zero, is switched to acquire the other equivalent capacity C2. Subsequently, the capacity of the variable capacity motor A with the equivalent capacity A2 is decreased to zero. Simultaneously with this, the variable capacity motor C, the capacity of which has been zero, is increased to the maximum, thereby acquiring the equivalent capacity C2.

Then, the variable capacity motor A and the output shaft are disconnected from each other, thereby decreasing the capacity of the variable capacity motor B with the equivalent capacity B2 to zero. Lastly, the variable capacity motor B and the output shaft are disconnected from each other, thereby decreasing the capacity of the variable capacity motor C with the equivalent capacity C2 and further accelerating the running speed. Incidentally, the number of equivalent capacities assigned to each variable capacity pump is not limited to two but may be one only, or more than two.

The description of the example where two drive gears are fitted to each motor shaft 18, 19 via clutches has been given. However, a plurality of clutches and a plurality of drive gears may be fitted to each motor shaft 18, 19 or a plurality of motor shafts.

In this case, a plurality of equivalent capacities are set for each variable capacity motor. An order of operation such as in descending order of equivalent capacity may be determined as appropriate.

Second Embodiment

Figure 4:
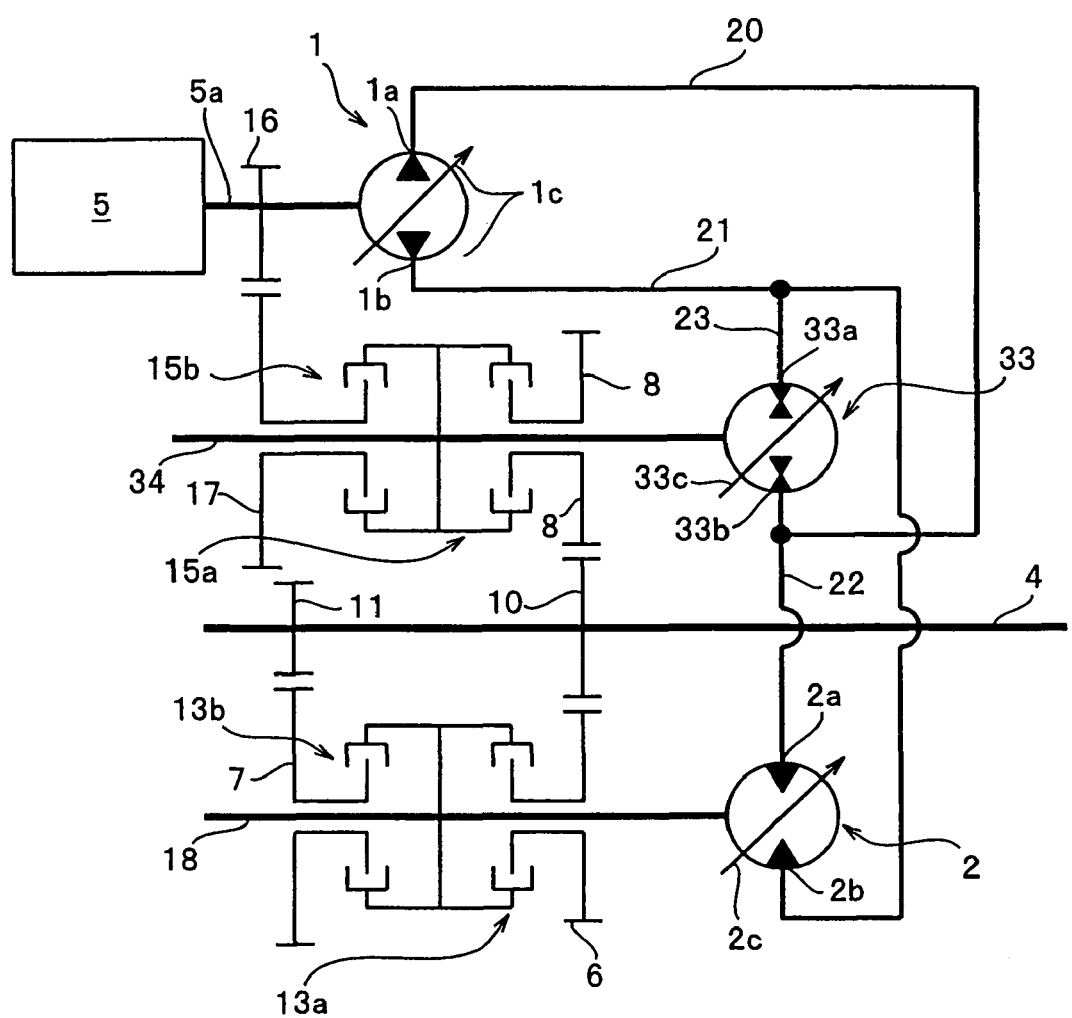
FIG. 4 is a diagram schematically showing the configuration of a circuit of the HST device (second embodiment).

Referring to FIG. 4, there will next be described a continuously variable transmission device according to a second embodiment of this invention, where, for example, a variable capacity pump 1, a variable capacity motor 2, and a variable capacity pump/motor 33 are used.

In this invention, the number of variable capacity motors composing the continuously variable transmission device is not limited to one but may be more than one. In addition, more than one variable capacity pump/motor 33 may be disposed as appropriate.

Reference numerals identical to those of the first embodiment are used in the description of components or the like which are identical in the first embodiment and explanations thereof are omitted.

A port 1a in the variable capacity pump 1 communicates with a port 2a in the variable capacity motor 2 and a port 33b in the variable capacity pump/motor 33. Likewise, a port 1b in the variable capacity pump 1 communicates with a port 2b in the variable capacity motor 2 and a port 33a in the variable capacity pump/motor 33.

A motor shaft 18 for receiving rotation output from the variable capacity motor 2, a motor shaft 34 for receiving rotation output from the variable capacity pump/motor 33, and an output shaft 4 for outputting drive force to a vehicle are disposed parallel to one another.

Fitted to the motor shaft 18 of the variable capacity motor 2 are a first drive gear 6 and second drive gear 7 via clutches 13a and 13b respectively. Fitted to the motor shaft 34 of the variable capacity pump/motor 33 are a third drive gear 8 and a second gear 17 via clutches 15a and 15b respectively.

The first drive gear 6 and third drive gear 8 mesh with a first driven gear 10 fitted to the output shaft 4. Likewise, the second drive gear 7 meshes with a second driven gear 11 fitted to the output shaft 4. The second gear 17 meshes with a first gear 16 fitted to a pump drive shaft 5a, which transmits rotation of an engine 5.

The equivalent capacity obtained by a combination of the first drive gear 6 and first driven gear 10 is assigned as the maximum equivalent capacity of the variable capacity motor 2. The next maximum equivalent capacity is the equivalent capacity of the variable capacity pump/motor 33 obtained by a combination of the third drive gear 8 and first driven gear 10. The smallest equivalent capacity is the equivalent capacity of the variable capacity motor 2 obtained by a combination of the second drive gear 7 and second driven gear 11.

The order of equivalent capacity is not limited to the foregoing order but may be another order. A plurality groups of speed change gears may comprise the drive gears and driven gears described above. A gear change may be carried out in two or more steps using speed change gears.

An example of the configuration in which drive gears allow a gear change in two or more steps is such that a clutch is disposed for each of gear groups and rotation from the gear groups can be extracted by a single drive gear by the connection or disconnection of each clutch. The single drive gear may be meshed with a driven gear fitted to an output shaft. Each gear group may comprise a planetary gear mechanism, a combination of gears of different reduction gear ratios or the like Next, referring to FIGS. 5 and 6, a control pattern and a control flow for the continuously variable transmission device as shown in FIG. 4 will be discussed. The horizontal axes of graphs in FIG. 5 all indicate a speed command value given in order to adjust the capacities of the variable capacity pump 1, variable capacity motor 2, and variable capacity pump/motor 33.

The vertical axis of the graph in FIG. 5(a) indicates the capacity of the variable capacity motor 2; that in FIG. 5(b), the capacity of the variable capacity pump/motor 33; and that in FIG. 5(c), the capacity of the variable capacity pump 1. The vertical axis in FIG. 5(d) indicates the speed of a vehicle.

Figure 6:
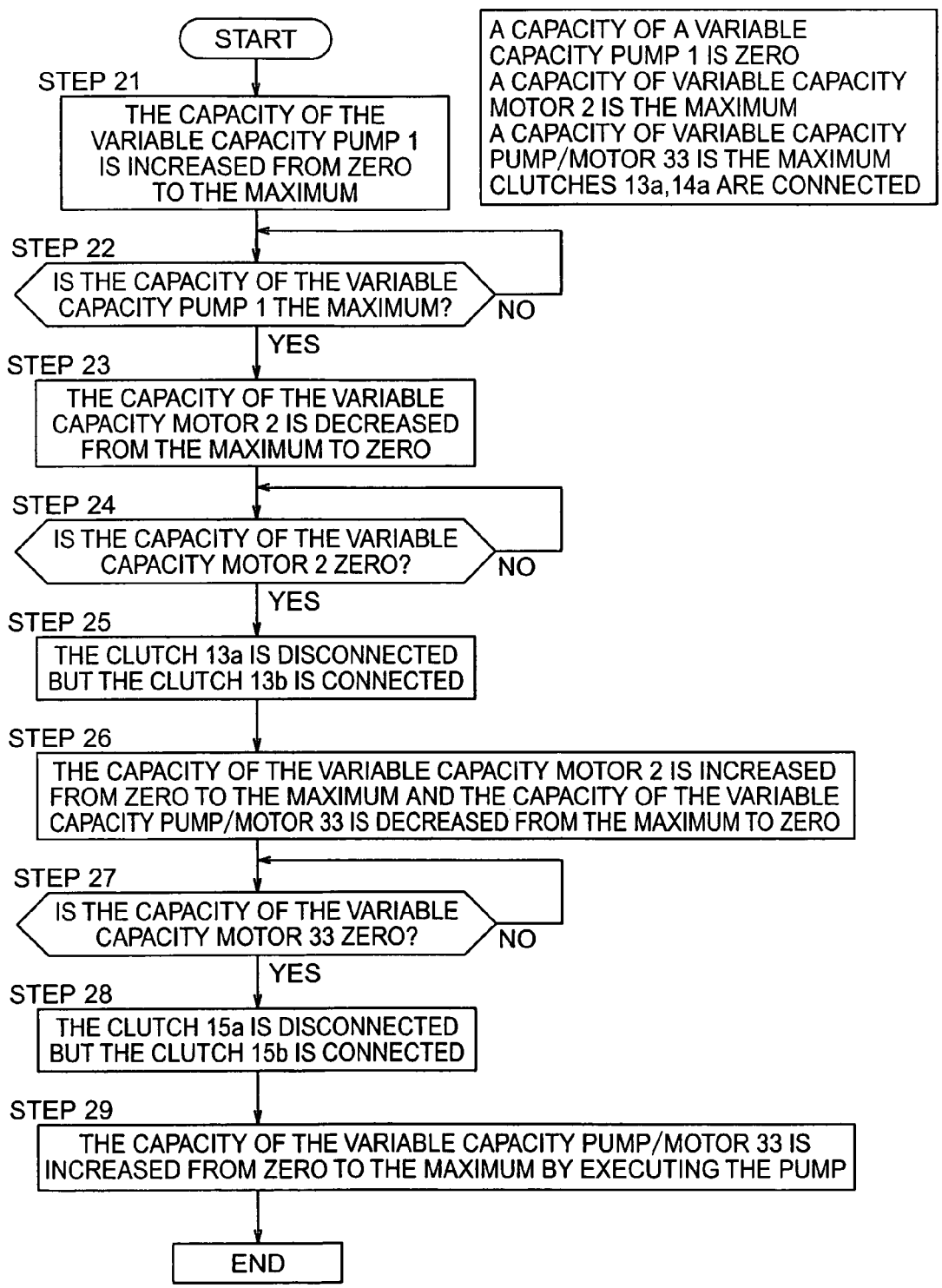
FIG. 6 is a control flow corresponding to FIG. 4 (second embodiment).

FIG. 6 shows the control flow for the continuously variable transmission device. The examples of the speed command value include the degree of operation of an operating lever for speed adjustment, and the number of revolutions of the engine 5.

In FIG. 4, if the speed of the vehicle is zero (i.e., the vehicle is stationary), specifically if the angle of the swash plate of the variable capacity pump 1 is zero, the angles of swash plates 2c and 33c of the variable capacity motors 2 and 33, respectively, are maximum.

Figure 5:
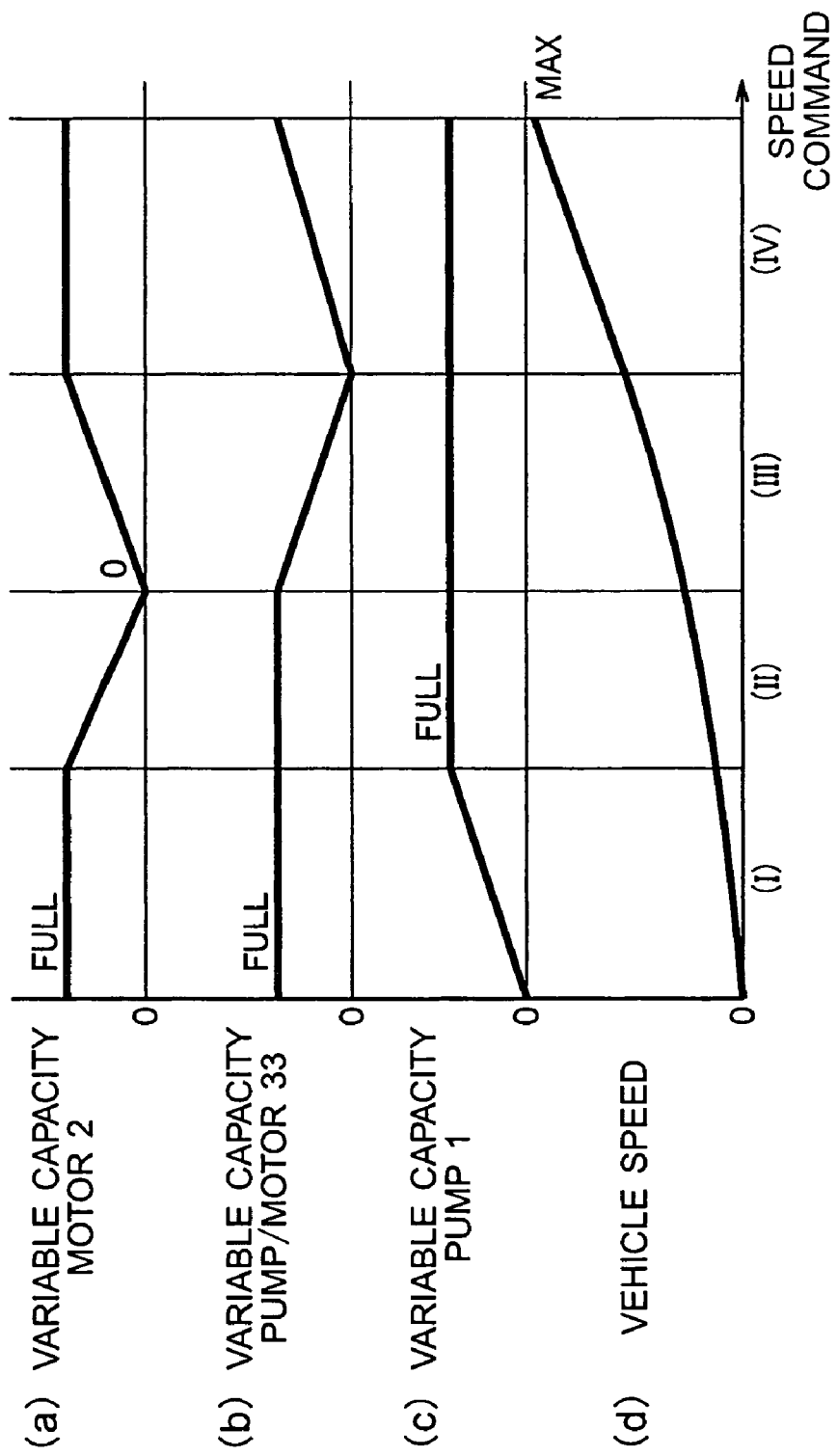
FIG. 5 is a control pattern for the configuration of the circuit of the HST device shown in FIG. 3 (second embodiment).

At this time, as shown in FIGS. 5(*a*) to (*c*), a vehicle speed command is zero, and the capacities of the variable capacity motor 2 and variable capacity pump/motor 33 are maximum. On the other hand, the capacity of the variable capacity pump 1 is zero.

In step 21 in FIG. 6, the capacity of the variable capacity pump 1 is increased from zero to the maximum by increasing the angle of the swash plate 1c of the variable capacity pump 1, which is shown in FIG. 4. Assuming that pressure oil has been delivered to an oil conduit 20 from the variable capacity pump 1 until this point, a description will be given below.

Since the swash plates 2c and 33c of the variable capacity motor 2 and variable capacity pump/motor 33 respectively are kept maximum, the rotations of the variable capacity motor 2 and variable capacity pump/motor 33 are controlled by the flow rate of pressure oil supplied from the oil conduit 20.

Rotation output from the variable capacity motor 2 is transmitted from the first drive gear 6 to the first driven gear 10 via the motor shaft 18, thereby rotating the output shaft 4. Simultaneously with this, rotation output from the variable capacity pump/motor 33 is transmitted to the third drive gear 8 and first driven gear 10 via the motor shaft 34, thereby rotating the output shaft 4.

Accordingly, the output shaft 4 is driven by the resultant force of the rotation output from the variable capacity motor 2 and rotation output from the variable capacity pump/motor 33. This makes it possible to output the high torque required to cause the engine to start running.

This condition corresponds to interval (I) in FIG. 5. As shown in FIG. 5(*c*), the capacity of the variable capacity pump 1 increases to the maximum from zero. Meanwhile, the variable capacity motor 2 and variable capacity pump/motor 33 retain their maximum capacities, as shown in FIGS. 5(*a*) and 5(*b*).

As shown in FIG. 5(*d*), the speed of the running vehicle increases from zero by virtue of the rotation outputs of the variable capacity motor 2 and variable capacity pump/motor 33.

In step 22 in FIG. 6, a determination is made whether the capacity of the variable capacity pump 1 has reached the maximum. If the capacity of the variable capacity pump 1 has not reached the maximum, the capacity of the variable capacity pump 1 is increased. When the capacity of the variable capacity pump 1 has reached the maximum, the flow proceeds to step 23.

In step 23 in FIG. 6, control is exerted so that the angle of the swash plate 2c of the variable capacity motor 2 is switched from the maximum to zero. Until this point, the flow rate of pressure oil delivered from the variable capacity pump 1 to the oil conduit 20 has been constant. However, decreasing the angle of the swash plate 2c of the variable capacity motor 2 from zero to the maximum can increase the rotation output of the variable capacity motor 2.

When the rotation output of the variable capacity motor 2 increases, rotation output transmitted from the first drive gear 6 to the first driven gear 10 via the motor shaft 18 increases, so that the output shaft 4 rotates at a higher speed. Consequently, the running vehicle accelerates.

In addition, as the capacity of the variable capacity motor 2 decreases, the flow rate of pressure oil flowing to the variable capacity pump/motor 33 from the oil conduit 20 increases. Further, the motor shaft 34 of the variable capacity pump/motor 33 is connected to the output shaft 4 via the first driven gear 10 and third drive gear 8. Accordingly, the motor shaft 34 is rotated at a number of revolutions matching the higher speed at which the output shaft 4 is rotating.

This condition corresponds to interval (II) in FIG. 5. As shown in FIG. 5(*a*), the capacity of the variable capacity motor 2 is decreased from the maximum to zero. Meanwhile, the variable capacity pump/motor 33 and variable capacity pump 1 retain their maximum capacities as shown in FIGS. 5(*b*) and 5(*c*). Consequently, the running vehicle accelerates, as shown in FIG. 5(*d*).

In step 24 in FIG. 6, a determination is made whether the capacity of the variable capacity motor 2 has reached zero or not. If the capacity of the variable capacity motor 2 has not reached zero, the capacity of the variable capacity motor 2 is decreased. When the capacity of the variable capacity motor 2 has reached zero, the flow proceeds to step 25.

In step 25 in FIG. 6, a clutch 13a is disconnected but the clutch 13b is connected. To be specific, the motor shaft 18 is connected to the output shaft 4 via the second drive gear 7 and second driven gear 11. At this time, the gear change ratio assigned to the motor shaft 18 is switched. However, since the capacity of the variable capacity motor 2 is zero, no output torque is transmitted. This prevents transmission shock when the gear change ratio assigned to the motor shaft 18 is switched.

In addition, when the gear change ratio assigned to the motor shaft 18 is switched, the variable capacity pump/motor 33 transmits the rotation to the output shaft 4 via the third drive gear 8 and first driven gear 10. This prevents such an occurrence that no torque is applied to the output shaft 4.

In step 26 in FIG. 6, the gear change ratio assigned to the motor shaft 18 of the variable capacity motor 2 is switched so that the rotation output of the motor shaft 18 can be transmitted from the second drive gear 7 to the second driven gear 11. Thereafter, the capacity of the variable capacity pump/motor 33 is decreased to zero from the maximum. Simultaneously with this, the capacity of the variable capacity motor 2 is increased to the maximum from zero.

Until this point, the flow rate of the pressure oil delivered to the oil conduit 20 from the variable capacity pump 1 has been constant. However, decreasing the angle of the swash plate 33c for the variable capacity pump/motor 33 to zero from the maximum can increase the rotation output from the variable capacity pump/motor 33.

The output shaft 4 is rotated by virtue of a difference between the rotation output of the variable capacity pump/motor 33 and the rotation output of the variable capacity motor 2. At this point, since the rotation output of the pump/motor 33 is greater than that of the motor 2, the rotation of the output shaft 4 further increases.

That is, in terms of equivalent capacity, the variable capacity pump/motor 33 is greater than the variable capacity motor 2. Accordingly, the rotation output of the pump/motor becomes greater than that of the motor 2. Thus, the running vehicle further accelerates.

This condition corresponds to interval (III) in FIG. 5. As shown in FIG. 5(*a*), the capacity of the variable capacity motor 2 increases to the maximum from zero. As shown in FIG. 5(*b*), the capacity of the variable capacity pump/motor 33 decreases from the maximum to zero. As shown in FIG.

5(*c*), the variable capacity pump 1 retains the maximum capacity. As shown in FIG. 5(*d*), the speed of the running vehicle becomes higher.

In step 27 in FIG. 6, a determination is made whether the capacity of the variable capacity pump/motor 33 has reached zero or not. If the capacity of the variable capacity pump/motor 33 has not reached zero, the capacity of the variable capacity pump/motor 33 is decreased. When the capacity of the pump/motor 33 has reached zero, the flow proceeds to step 28.

In step 28 in FIG. 6, the clutch 15*a* is disconnected but the clutch 15*b* is connected. In other words, the motor shaft 34 of the variable capacity pump/motor 33 is connected, via the second drive gear 17 and first drive gear 16, to the pump drive shaft 5*a* extending from the engine 5.

At this time, the gear change ratio assigned to the motor shaft 34 is switched. However, since the capacity of the variable capacity pump/motor 33 is zero, no output torque is transmitted. This prevents transmission shock when clutch switching takes place on the motor shaft 34.

Even when switching between the clutches 15*a* and 16*b* takes place on the motor shaft 34, the variable capacity motor 2, which has been operating at maximum capacity, is rotated by virtue of the flow rate of pressure oil pumped from the variable capacity pump 1, and transmits the rotation to the output shaft 4 via the second drive gear 7 and second driven gear 11. This prevents moment at which no torque of the output shaft 4.

In step 29 in FIG. 6, the variable capacity pump/motor 33 functions as a pump. Specifically, the pumping action of the pump/motor 33 is caused by the rotation of the engine 5.

In FIG. 4, the variable capacity pump/motor 33 delivers pressure oil from the port 33*b*, and supplies the pressure oil to the port 2*a* of the variable capacity motor 2 together with the pressure oil delivered from the variable capacity pump 1.

Accordingly, the increase in the flow rate of the pressure oil supplied to the variable capacity motor 2 increases the number of revolutions of the motor 2. Specifically, this increases the rotation output transmitted to the motor shaft 18 from the variable capacity motor 2, and hence the rotation output transmitted to the output shaft 4 via the second drive gear 7 and second driven gear 11.

Accordingly, the running vehicle further accelerates.

This condition corresponds to interval (IV) in FIG. 5. As shown in FIG. 5(*a*), the variable capacity motor 2 retains the maximum capacity while the number of revolutions increases due to the pressure oil delivered from the variable capacity pump 1 and variable capacity pump/motor 33.

As shown in FIG. 5(*b*), the variable capacity pump/motor 33 acts as a pump and the capacity of it increases from zero to the maximum. As shown in FIG. 5(*c*), the variable capacity pump 1 retains the maximum quantity.

Consequently, the speed of the running vehicle becomes higher as shown in FIG. 5(*d*).

Further steps in the control pattern and control flow are not described in FIGS. 5 and 6. However, the following steps can be taken: after the capacity of the variable capacity pump/motor 33 is increased to the maximum, the capacity of the variable capacity motor 2 is decreased from the maximum to a half, for example. This makes it possible to further accelerate the running vehicle.

This realizes the continuously variable transmission device in which a gear change ratio is greatly increased. Furthermore, the gear change ratio is switched from the clutch 13*a* to the clutch 13*b* or from the clutch 15*a* to the clutch 15*b* while the rotation output from the variable capacity motor 2 or variable capacity pump/motor 3 retaining the maximum capacity has been transmitted to the output shaft 4.

This prevents such an occurrence that no torque is applied when the gear change ratio is switched or when clutches 15*a* and 15*b* are switched from one to the other.

Accordingly, this prevents moment at which no torque is applied even when the clutch or the gear change ratio is switched while the vehicle is running up a hill. Further, switching the gear change ratio or clutch when the capacity of the variable capacity motor or variable capacity pump/motor is zero prevents transmission shock.

FIG. 4 exemplifies the case where the two speed change gears, each of which comprises the drive gear and driven gear, are disposed between the motor shaft 18 and the output shaft 4 and the one speed change gear, which comprises the drive gear and driven gear, is disposed between the motor shaft 18 and output shaft 4.

However, in this invention, the number of speed change gears disposed between the motor shaft 18 and output shaft 4 and the number of speed change gears disposed between the motor shaft 18 and output shaft 4 are not limited to those described above. Disposing an appropriate number of speed change gears between the motor shaft 18 and output shaft 4 and an appropriate number of speed change gears between the motor shaft 18 and output shaft 4 allows an increase in the number of equivalent capacities. Further, the number of equivalent capacities may be increased by disposing plural variable capacity motors.

Where the number of equivalent capacities is increased, it is necessary that the equivalent capacities of the variable capacity motor and variable capacity pump/motor be set in descending order.

A concrete example is given of a case where three variable capacity motors, A, B, and C, and one variable capacity pump/motor, D, are used. Two different equivalent capacities are set for each of the variable capacity motors A to C and the variable capacity pump/motor D according to a gear change ratio assigned to a corresponding speed change gear.

For example, one of the two equivalent capacities of the variable capacity motor A is assigned as the maximum equivalent capacity A1. One of the two equivalent capacities of the variable capacity motor B is assigned as a second maximum equivalent capacity B1. One of the two equivalent capacities of the variable capacity motor C is assigned as a third maximum equivalent capacity C1.

The gear change ratios of the speed change gears are set so that the other equivalent capacity A2 of the variable capacity motor A, the other equivalent capacity B2 of the variable capacity motor B, one of the equivalent capacities of the variable capacity pump/motor D, namely equivalent capacity D1, the other equivalent capacity C2 of the variable capacity motor C, the other equivalent capacity D2 of the variable capacity pump/motor D decrease in that order.

First, control is exerted such that the capacity of the variable capacity motor A with the equivalent capacity A1 is decreased to zero. The gear change ratio of the variable capacity motor A, the capacity of which has decreased to zero, is switched so that the equivalent capacity is switched to the other equivalent capacity A2.

Next, the capacity of the variable capacity motor B with the equivalent capacity B1 is decreased to zero. Simultaneously with this, the variable capacity motor A, the capacity of which has been zero, is increased to the maximum capacity so as to acquire the equivalent capacity A2.

Subsequently, the gear change ratio of the variable capacity motor B, the capacity of which has reached zero, is switched to acquire the other equivalent capacity B2. Then, the capacity of the variable capacity motor C with the equivalent capacity C1 is decreased to zero. Simultaneously with this, the variable capacity motor B, the capacity of which has been zero, is increased to the maximum capacity, thereby switching to the equivalent capacity B2.

Further, the gear change ratio of the variable capacity motor C, the capacity of which has decreased to zero, is switched to acquire the other equivalent capacity C2. Subsequently, the capacity of the variable capacity motor A with the equivalent capacity A2 is decreased to zero. Simultaneously with this, the variable capacity motor C, the capacity of which has been zero, is increased to the maximum, thereby acquiring the equivalent capacity C2.

Then, the variable capacity motor A and the output shaft are disconnected from each other, thereby decreasing the capacity of the variable capacity motor B with the equivalent capacity B2 to zero. Subsequently, the variable capacity motor B and the output shaft are disconnected from each other, thereby decreasing the capacity of the variable capacity pump/motor D with the equivalent capacity D1 to zero.

The gear change ratio of the variable capacity pump/motor D, the capacity of which has decreased to zero, is switched to acquire the other equivalent capacity D2. Then, the variable capacity pump/motor D is disconnected from the output shaft and connected to the drive shaft as of the engine.

Therefore, the variable capacity pump/motor D subsequently is caused to function as a pump. The capacity of the variable capacity pump/motor D is changed from zero to the maximum. Consequently, the variable capacity motor C, the maximum capacity of which has been the equivalent capacity C2, is supplied with pressure oil delivered by the variable capacity pump/motor D, acting as a pump, in addition to pressure oil delivered by the variable capacity pump.

This further increases the speed of the variable capacity motor C and hence the speed of the running vehicle. In addition, decreasing the capacity of the variable capacity motor C with the variable capacity motor C2 further increases the speed of the running vehicle.

Accordingly, the speed of the running vehicle can be continuously increased by such a foregoing control that the capacities are decreased from their respective maximums in descending order of equivalent capacity. If the capacity of any one of the variable capacity motors is zero when the capacities are decreased from their respective maximums in descending order of equivalent capacity, the gear change ratio of this variable capacity motor is changed to decrease the equivalent capacity, thereby increasing the capacity from zero to the maximum.

In order to increase the speed of the vehicle in a manner described above, the number of variable capacity motors the capacities of which are controlled to decrease may be increased. Incidentally, the equivalent capacities D1 and D2 of the variable capacity pump/motor D may be greater than the other equivalent capacity A2 of the variable capacity motor A and the other equivalent capacity B2 of the variable capacity motor B respectively, for example.

This also enables the variable capacity pump/motor D to function as a pump in course of the acceleration of the running vehicle, thereby increasing the speed of the variable capacity motor the capacity of which has been maximum. The foregoing order of equivalent capacity is just an example, and other order or a combination of other orders may be used.

Further, the number of equivalent capacities assigned to each variable capacity pump and the variable capacity pump/motor is not limited to two but may be one only, or more than two. Incidentally, a combination of equivalent capacities in descending order, other order of equivalent capacity or the like may be determined as appropriate.

Third Embodiment

There will next be described a continuously variable transmission device according to a third embodiment of the invention with reference to FIG. 7 exemplifying the case where the variable capacity pump 1 and the variable capacity motors 2 and 3 are used. The invention does not limit the number of variable capacity motors to two but may be more than two in order to form a continuously variable transmission device.

The first embodiment exemplifies the case where the third drive gear 8 and fourth drive gear 9 are fitted to the motor shaft 19 of the variable capacity motor 3. In the third embodiment, instead of fitting the third and fourth drive gears 8 and 9 to the motor shaft 19, a drive gear 27 and gear groups 28 and 29 (which comprise planetary gear mechanisms selectively connectable to the drive gear 27 via the clutches 26a and 26b) are fitted to the motor shaft 19. The other features of the configuration are identical to those of the first embodiment.

Reference numerals identical to those of the first embodiment are used in the description of components or the like which are identical in the first embodiment and explanations thereof are omitted. Therefore, a description will be given focusing on the features of the configuration that are different from those in the first embodiment.

Figure 7:
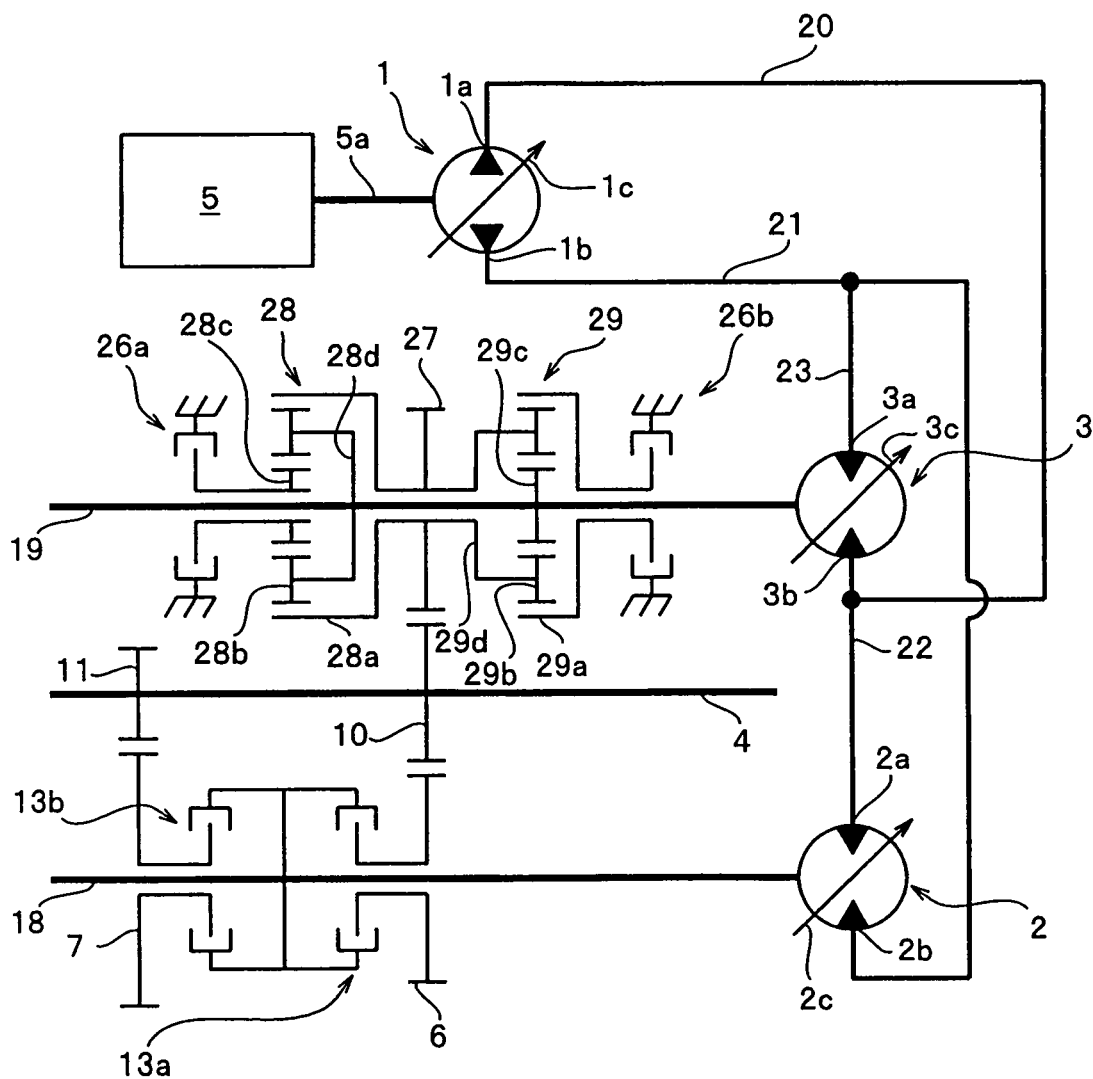
FIG. 7 is a diagram schematically showing the configuration of a circuit of the HST device (third embodiment).

In FIG. 7, two drive gears, 6 and 7, are fitted to the motor shaft 18. However, instead of the drive gears 6 and 7, selectively connectable gear groups comprising a combination of gears of different gear change ratios may be fitted to the motor shaft 18 as in the case of the motor shaft 19.

The drive gear 27 is pivotally supported on the motor shaft 19 in FIG. 7 so as to be freely rotatable. The drive gear 27 is connected to the two planetary gear mechanisms, one comprising the gear group 28 and the other the gear group 29. Specifically, the ring gear 28a of the gear group 28 and the drive gear 27 are so connected as to be integrally rotatable. A plurality of planetary gears 28b meshing with the ring 28a are supported by a carrier 28d so as to be freely rotatable.

The carrier 28d is fixed to the motor shaft 19 of the variable capacity motor 3. A sun gear 28c meshing with each planetary gear 28b can be switched between a fixed state and a freely rotating state by the operation of the clutch 26a.

In addition, the drive gear 27 is connected to the carrier 29d of the gear group 29 so as to be freely and integrally rotatable with it. A plurality of planetary gears 29b, supported by the carrier 29d so as to be freely rotatable, mesh with a sun gear 29c fixed to the motor shaft 19.

In addition, the planetary gears 29b mesh with a ring gear 29a connected to the clutch 26b. The ring gear 29a can be switched between a fixed state and a freely rotatable state by the operation of the clutch 26b.

Thus, such speed changing means, either one of which can be selected by the clutch 26a or 26b, are formed, and the drive gear 27 output from the speed changing means selected meshes with the first driven gear 10 of the output shaft 4. Examples of the speed change gear according to the invention includes the one that comprises a driven gear and a drive gear furnished with a speed changing means as well as one that comprises a single drive gear and driven gear.

Next, the operations of the speed changing means will be explained. A description will be given exemplifying the case where, with the sun gear 28c fixed to a fixing member, the fixing member and the ring gear 29a of the planetary gear mechanism of the gear group 29 are disconnected by the clutch 26b.

The planetary gears 28b supported by the carrier 28d rotated together with the motor shaft 19 rotate on their axes while rotating around the fixed sun gear 28c. The rotations of the planetary gears 28b rotate the ring gear 28a and hence the drive gear 27 connected to the ring gear 28a.

The clutch 26b for the gear group 29 has thus disconnected the ring gear 29b and the fixing member. Therefore, the ring gear 29a is in the state of being freely rotatable. The carrier 29d connected to the drive gear 27 at this time is rotated together with the drive gear 27, and the sun gear 29c fixed to the motor shaft 19 is also rotated. In addition, the planetary gears 29b supported by the carrier 29d are in the state of being freely rotatable together with the ring gear 29a.

Accordingly, even if the carrier 29d and the sun gear 29c fixed to the motor shaft 19 are rotated, the rotations are absorbed by the free rotations of the planetary gears 29b and the ring gear 29a.

This prevents the rotation transmitted from the sun gear 29c fixed to the motor shaft 19 from affecting the rotation of the carrier 29d.

Next, a description is given of the case where the sun gear 28c of the gear group 28 and the fixing member are disconnected by the clutch 26a, and the ring gear 29a and the fixing member are connected by the clutch 26b of the gear group 29.

The ring gear 29a and the fixing member have been fixed by the clutch 26b. By virtue of this, the rotation of the sun gear 29c fixed to the motor shaft 19 causes the planetary gears 28b, supported by the carrier 29d, to rotate on their axes while rotating around the ring gear 29a.

Consequently, the carrier 29d and hence the drive gear 27 fixed to the carrier 29d rotate. On the other hand, since the sun gear 28c and the fixing member have been disconnected by the clutch 26a of the gear group 28, the sun gear 28c is in a freely rotatable state.

Accordingly, even if the ring gear 28a connected to the drive gear 27 and the carrier 28d fixed to the motor shaft 19 are rotated, the rotations are absorbed by the free rotations of the sun gear 28c and planetary gear 28b.

This prevents the rotation of the carrier 28d fixed to the motor shaft 19 from affecting the rotation of the ring gear 29a.

This enables the drive gear 27 to rotate by selectively coming into contact with the rotating planetary gear mechanism of the gear group 28 or 29 by the operation of the clutch 26a and/or 26b.

In other words, the equivalent capacities of the variable capacity motor 2 corresponding to the two gear change ratios and the equivalent capacities of the variable capacity motor 3 corresponding to the two gear change ratios using the two planetary gear mechanisms can be converted into the correspondingly different equivalent motor capacities. By controlling their capacities in descending order of equivalent motor capacity in the same manner as in the first embodiment, the speed of the running vehicle can be increased in a continuous manner.

In the third embodiment, a description was given exemplifying the case where one of two gear change ratios can be selected for each motor shaft. However, the configuration may be such that more than one gear change ratio can be selected for each motor shaft. Also, a continuously variable transmission device may be configured so as to allow a plurality of gear change ratios by use of a plurality of variable capacity motors.

Comparative Examples

Next, referring to FIGS. 8 to 13, a comparison between gear change, in a vehicle with the continuously variable transmission device according to the invention and one with a conventional continuously variable transmission device will be discussed.

Figure 8:
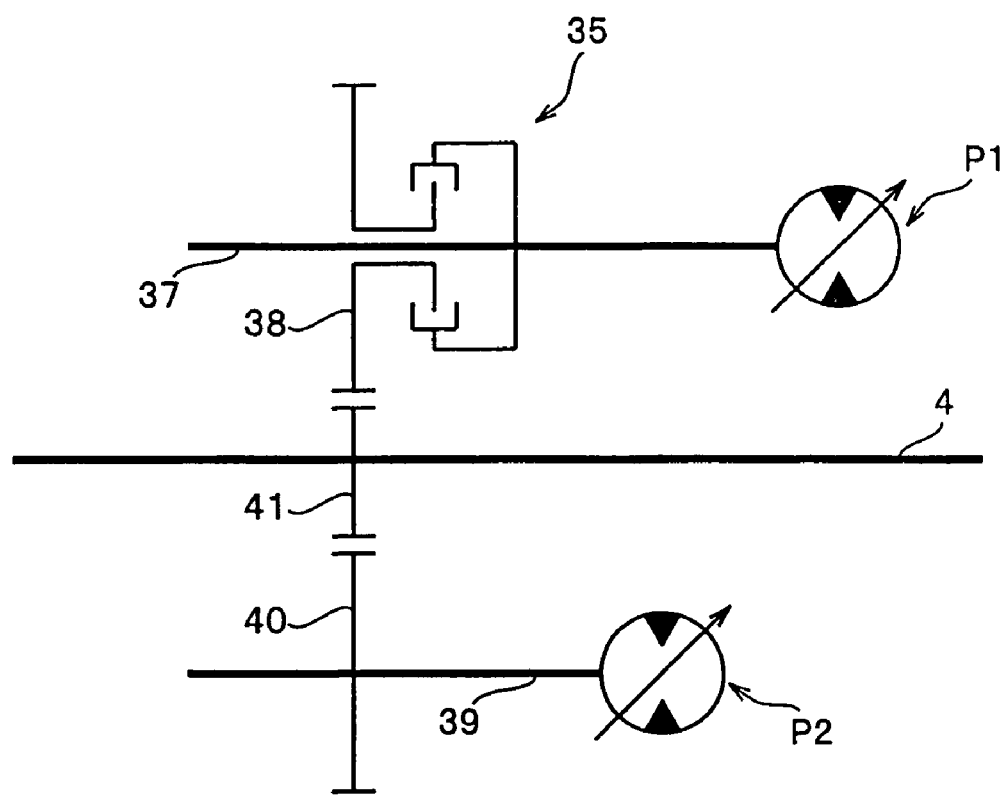
FIG. 8 is a diagram schematically showing the main part of a circuit of an HST device (comparative example).
Figure 9:
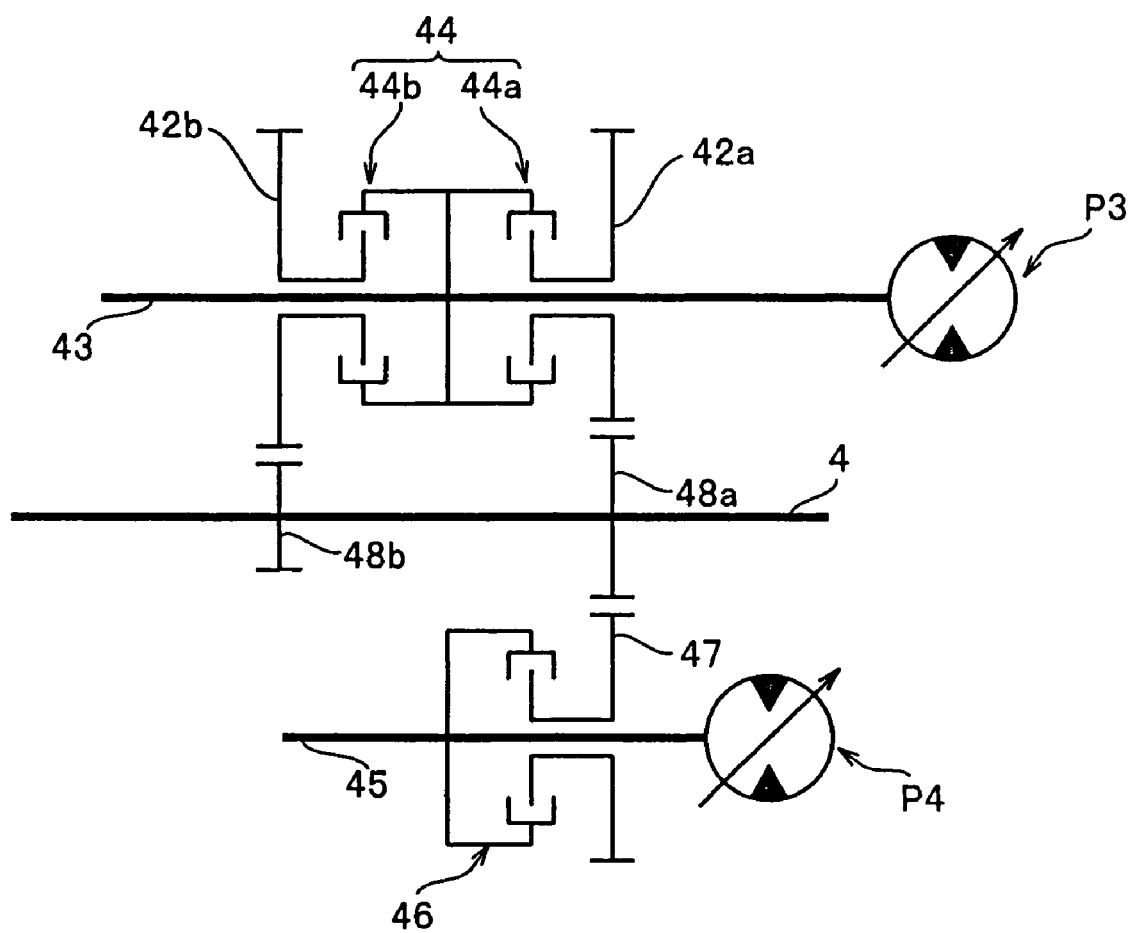
FIG. 9 is a diagram schematically showing the main part of a circuit of an HST device (embodiment).
Figure 14:
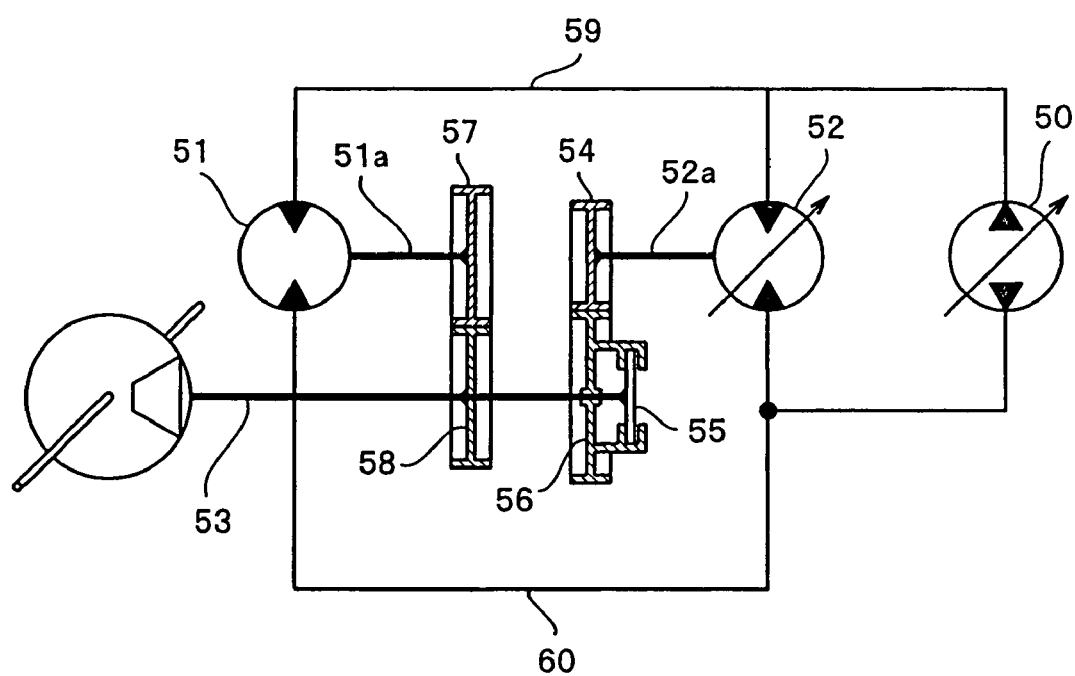
FIG. 14 is a diagram schematically showing the configuration of a circuit of an HST device (conventional example 1).
Figure 15:
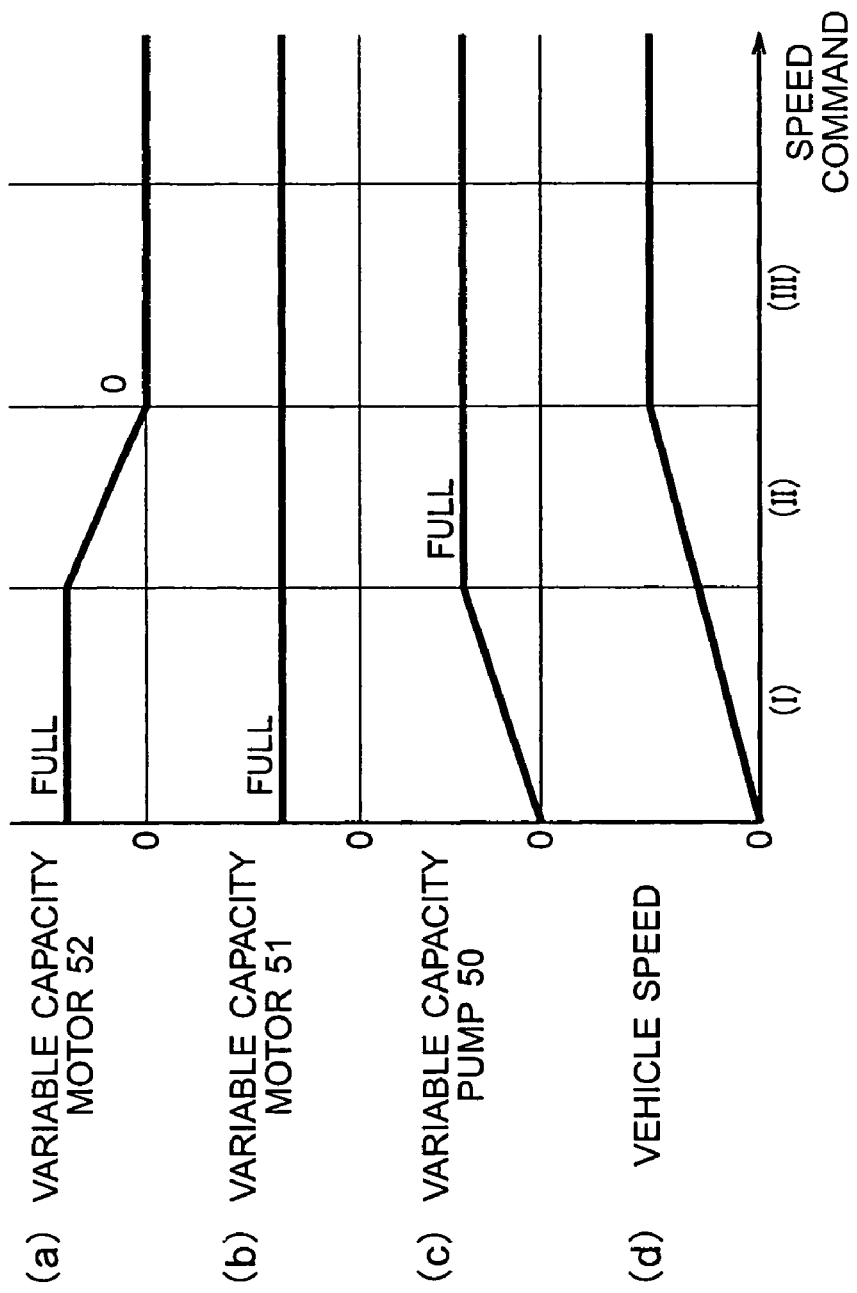
FIG. 15 is a control pattern for the configuration of the circuit of the HST shown in FIG. 14 (conventional example 1).
Figure 16:
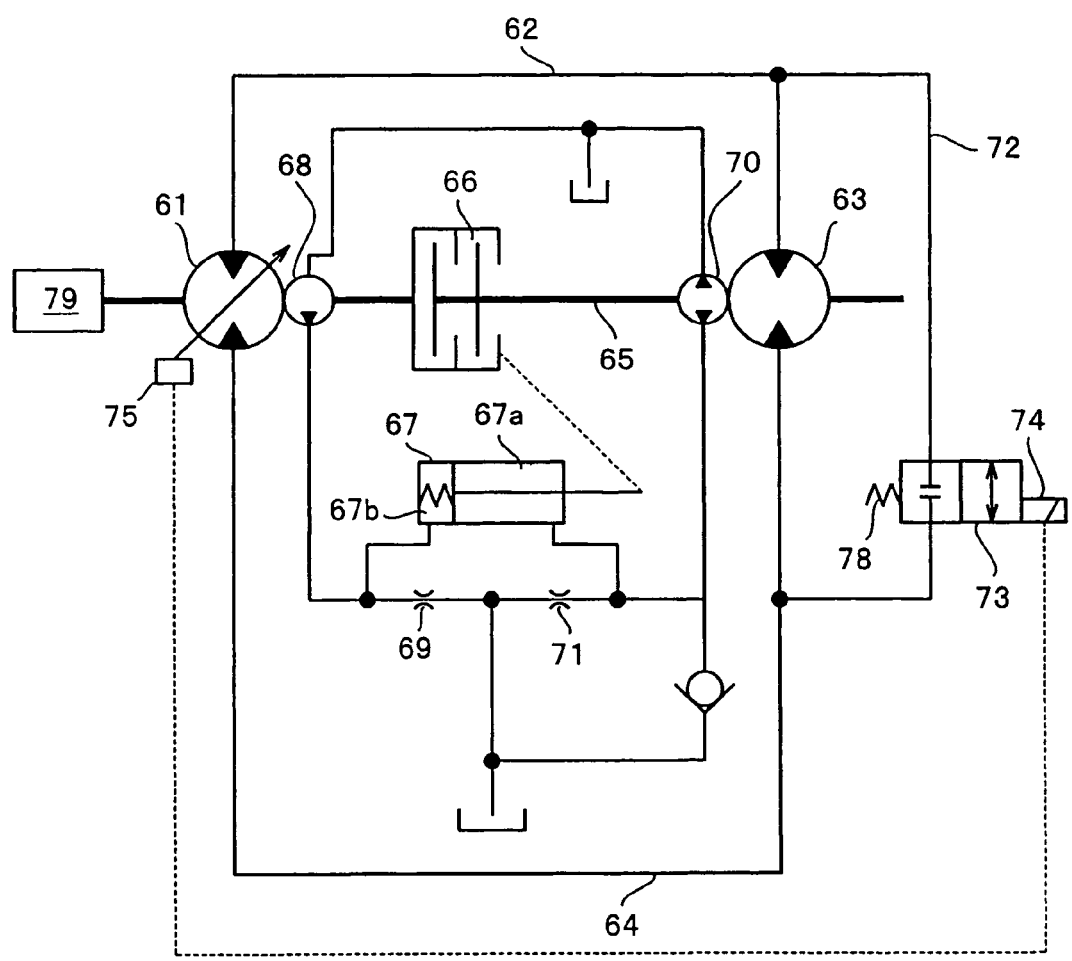
FIG. 16 is a diagram schematically showing the configuration of a circuit of an HST (conventional example 2).

In FIGS. 8 and 9, the variable capacity pump that forces pressure oil to flow to the two variable capacity motors, and the hydraulic circuit formed between this variable capacity pump 2 and the two variable capacity motors, are omitted. In FIG. 8, speed change gears are shown in a rough sketch of the hydraulic fixed capacity motor 51 and variable capacity motor 52 shown in FIG. 14, as a conventional example 1. The control pattern for the HST circuit shown in FIG. 14 corresponds to that shown in FIG. 15, so an explanation thereof will be omitted.

Specifically, in FIG. 8, the fixed capacity motor 51 is shown as a variable capacity motor P1 and the variable capacity motor 52 is shown as a variable capacity hydraulic motor P2. In FIG. 9, the variable capacity motors 2 and 3 in FIG. 1 are shown in a rough sketch.

To be more specific, the variable capacity motors 2 and 3 are shown as variable capacity motors P3 and P4 respectively in FIG. 9. One gear change ratio is assigned to the variable capacity motor P4 such as to be identical to that assigned to the variable capacity motor 2 in the conventional example.

The maximum capacities of the variable capacity pump (not shown) in the conventional example in FIG. 8 and of that in an example relating to this invention in FIG. 9 are each approximately 120 cc/rev. The maximum capacities of the variable capacity motors P1 and P2 in the conventional example are each approximately 160 cc/rev.

A gear change ratio assigned to the variable capacity motor P1 is ×3.86, and that assigned to P2 is ×1.0. Specifically, the equivalent capacity of the variable capacity motor P1 is approximately 618 cc/rev and that of the variable capacity motor P2 is approximately 160 cc/rev.

On the other hand, the maximum capacities of the variable capacity motors P3 and P4 shown in FIG. 9 as forming the continuously variable transmission device of the invention are each approximately 100 cc/rev, which is smaller than the maximum capacities of the variable capacity motors P1 and P2 given as the conventional example. In addition, as a gear change ratio assigned to the variable capacity motor P3, either ×5.3 or ×1.0 can be selected, and that assigned to the variable capacity motor P4 is ×2.5.

Specifically, as an equivalent capacity of the variable capacity motor P3, approximately 530 cc/rev or approximately 100 cc/rev can be selected. An equivalent motor capacity for the variable capacity motor P4 is approximately 250 cc/rev.

In FIG. 8 showing the conventional example, a drive gear 38 fitted to the motor shaft 37 of the variable capacity motor P1 transmits rotation, via a clutch 35, to a driven gear 41 fitted to the output shaft 4. The motor shaft 39 of the variable capacity motor P2 transmits rotation, via a drive gear 40, to the driven gear 41 fitted to the output shaft 4.

In FIG. 9 showing an example of this invention, drive gears 42a and 42b are fitted to the motor shaft 43 of the variable capacity motor P3 so as to be connected to or disconnected from the motor shaft 43 by clutches 44a and 44b respectively.

A drive gear 47 is fitted to the motor shaft 45 of the variable capacity motor P4 via a clutch 46. Whereas the drive gears 42a and 42b fitted in combination to the motor shaft 43 of the variable capacity motor P3 mesh with driven gears 48a and 48b respectively fitted to the output shaft 4, a drive gear 47 fitted to the motor shaft 45 of the variable capacity motor P4 meshes with the driven gear 48a of the output shaft 4.

Figure 10:
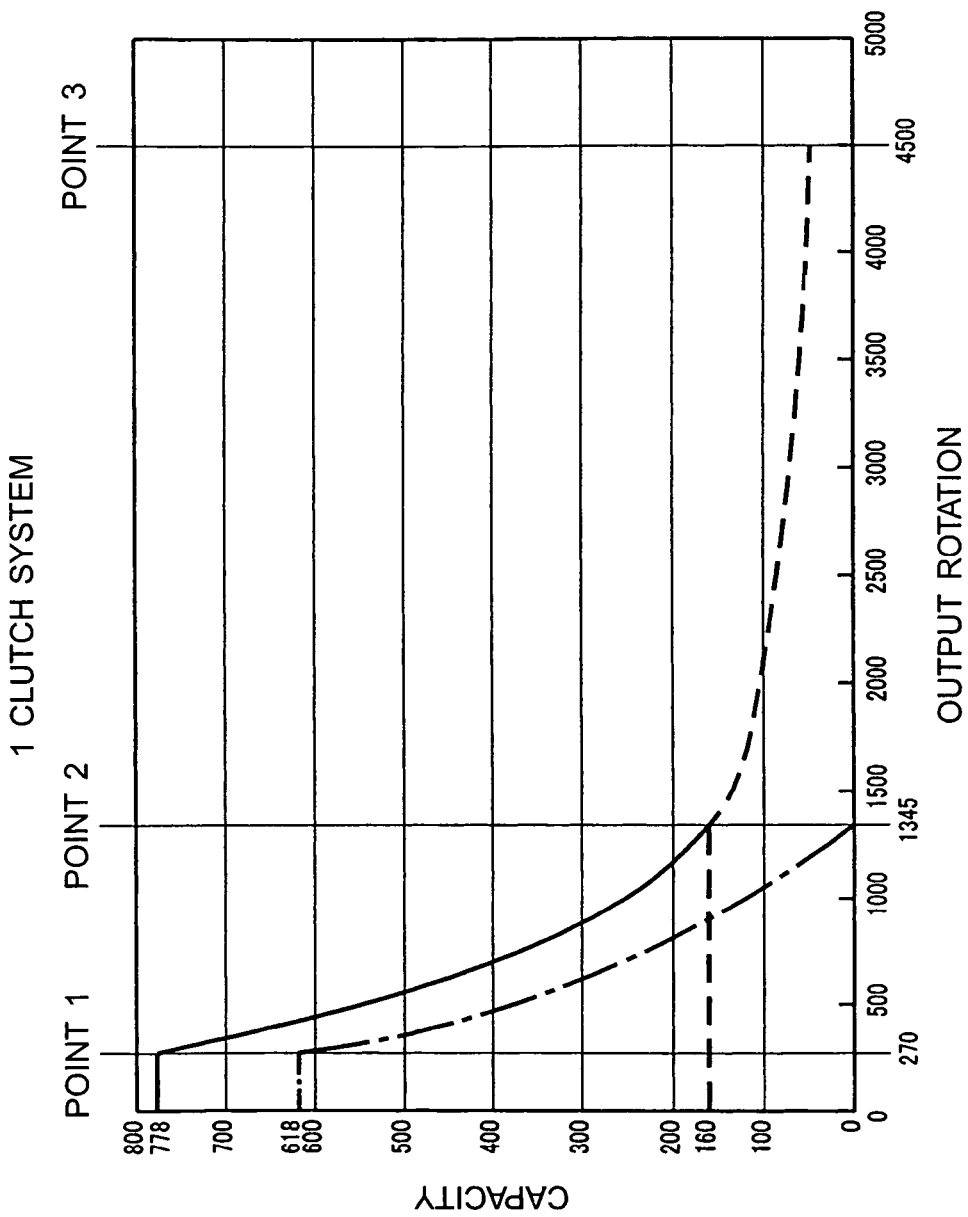
FIG. 10 is a control pattern for the configuration of the circuit of the HST shown in FIG. 8 (comparative example).
Figure 11:
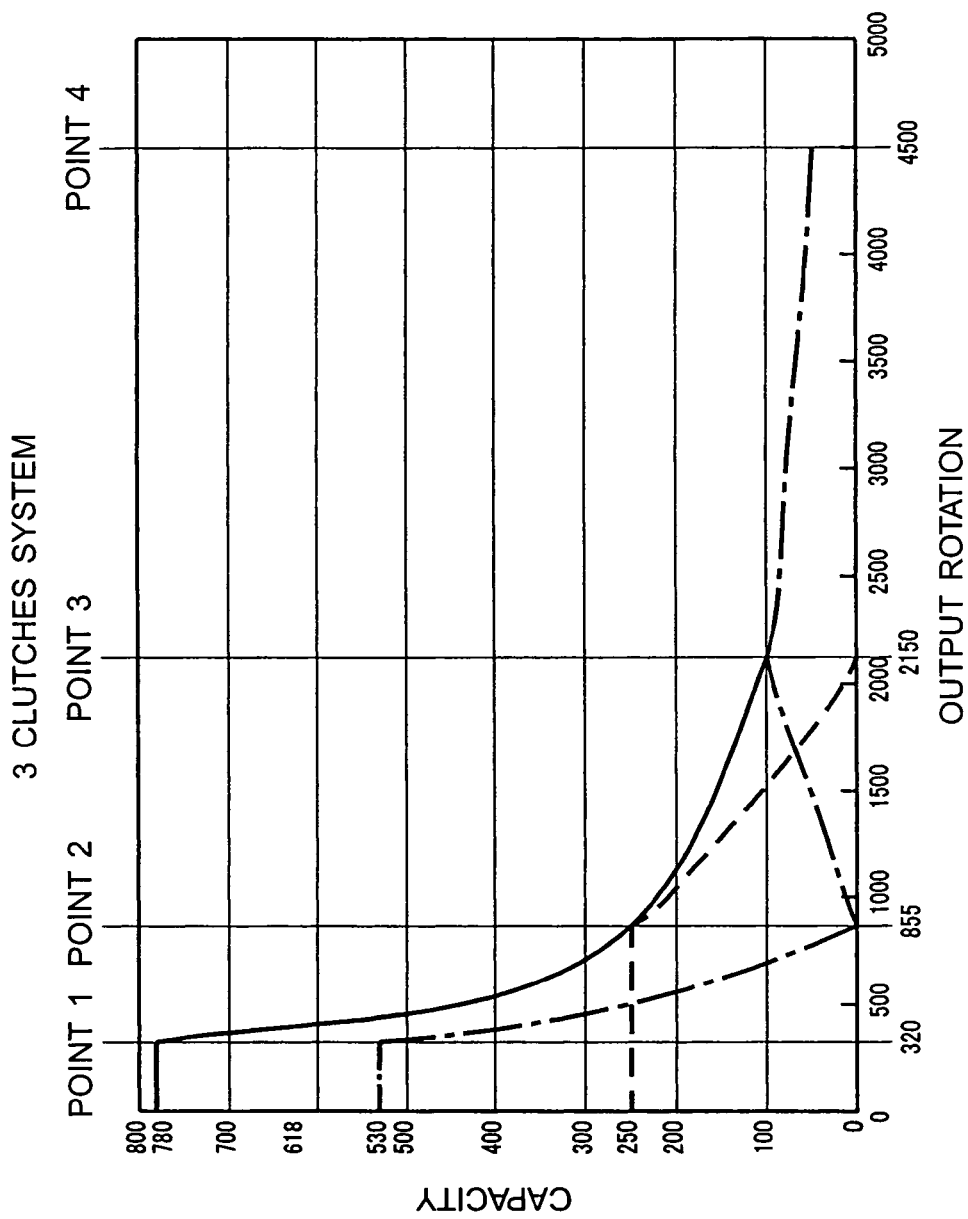
FIG. 11 is a control pattern for the configuration of the circuit of the HST shown in FIG. 9 (embodiment).

FIG. 10 shows a graph representing the interrelations of the respective equivalent capacities of the variable capacity motors P1 and P2, the variable capacity pump, and the output rotation of the output shaft 4, which are shown in FIG. 8. FIG. 11 shows a graph representing the interrelations of the respective equivalent capacities of the variable capacity motors P3 and P4, the variable capacity pump, and the output rotation of the output shaft 4.

In FIG. 10, a chain line indicates the equivalent capacity of the variable capacity motor P1, and a dashed line indicates the equivalent capacity of the variable capacity motor P2. A solid line indicates the sum of the equivalent capacities of the variable capacity motors P1 and P2.

Similarly, in FIG. 11, a chain line indicates the equivalent capacity of the variable capacity motor P3, and a dashed line indicates the equivalent capacity of the variable capacity motor P4. A solid line indicates the sum of the equivalent capacities of the variable capacity motors P3 and P4.

In the example of the conventional continuously variable transmission device shown in FIG. 8, when the capacity of the variable capacity pump (not shown) is the maximum, the equivalent capacities of the variable capacity motors P1 and P2 are approximately 618 cc/rev and 160 cc/rev respectively, and the sum of their equivalent capacities is approximately 778 cc/rev, as shown in FIG. 10. At this time, the number of revolutions of the output shaft 4 is approximately 270 rpm.

In this condition, if the equivalent capacity of the variable capacity motor P1 is decreased, the equivalent capacity of P1 decreases along the curved chain line, as shown in FIG. 10, so that the number of revolutions of the output shaft 4 increases to approximately 1345 rpm. At this time, the equivalent capacity of the variable capacity motor P2 maintains approximately 160 cc/rev, as indicated by the dashed line.

Next, the clutch 35 is disengaged to disconnect the variable capacity motor P1 and the output shaft 4. Then, the equivalent capacity of the variable capacity motor P2 is decreased along the curved dashed line shown in FIG. 10. When the equivalent capacity of the variable capacity motor P2 reaches approximately 46 cc/rev, the number of revolutions of the output shaft 4 increases up to approximately 4500 rpm.

On the other hand, the continuously variable transmission device according to this invention shown in FIG. 9 yields a result shown in the graph in FIG. 11, in which case control is exerted so that the number revolutions of the output shaft 4 finally reaches approximately 4500 rpm, which is identical to that in the case shown in FIG. 10.

When the variable capacity pump (not shown) is at the maximum, the number of revolutions of the output shaft 4 is approximately 320 rpm, as shown in FIG. 11. At this time, the equivalent capacities of the variable capacity motor P3 and P4 are approximately 530 cc/rev and 250 cc/rev respectively, and the sum of their equivalent capacities is approximately 780 cc/rev.

Next, the capacity of the variable capacity motor P3 is decreased with a gear change ratio of ×5.3, as shown by the curved chain line in FIG. 11, so that the number of revolutions of the output shaft 4 increases up to approximately 855 rpm.

Subsequently, the clutch 44a is disengaged and the clutch 44b is connected such that the gear change ratio assigned to the variable capacity motor P3 is switched to ×1.0. At this point, the equivalent capacity of the variable capacity motor P4 is maintained at 250 cc/rev.

Then, the equivalent capacity of the variable capacity motor P4 is decreased as shown by the curved dashed line in FIG. 11. Simultaneously, the equivalent capacity of the variable capacity motor P3 is increased from zero so that its equivalent motor capacity reaches approximately 100 cc/rev, as shown by the chain line in FIG. 11. This increases the number of revolutions of the output shaft 4 up to approximately 2150 rpm.

Next, the clutch 46 is disengaged to disconnect the variable capacity motor P4 and output shaft 4. Then, the equivalent capacity of the variable capacity motor P3, currently 100 cc/rev, is decreased as shown by the chain line in FIG. 11. By decreasing this equivalent capacity to approximately 46 cc/rev, the number of revolutions of the output shaft 4 is increased up to approximately 4500 rpm.

As is apparent from FIGS. 10 and 11, the variable capacity motors according to this invention, the maximum capacities of which are smaller than those of conventional variable capacity motors, can continuously increase the number of revolutions of the output shaft up to the same number of revolutions. Specifically, this enables a running vehicle to increase its speed smoothly. Furthermore, this allows the use of a variable capacity motor of small capacity.

FIGS. 12 and 13 show a comparison between the capacity efficiencies η of the hydraulic pumps (not shown) used in the examples shown in FIGS. 8 and 9, where the number of revolution of the output shaft 4 is approximately 4500 rpm and the delivery pressure of the variable capacity pump (not shown) is 20 MPa. The capacity efficiencies η of the hydraulic pumps in FIGS. 12 and 13 are calculated by a conversion formula based on the capacity efficiencies η of a commercially available general hydraulic pump.

Specifically, FIG. 12 shows the capacity efficiencies η of the conventional continuously variable transmission device shown in FIG. 10. In FIG. 12, "Stationary" indicates that the output rotation is zero in FIG. 10. "Point 1" indicates that the output rotation is approximately 270 rpm; "Point 2," approximately 345 rpm; and "Point 3," approximately 4500 rpm.

Likewise, FIG. 13 shows the capacity efficiencies η of the continuously variable transmission device of this invention shown in FIG. 11. In FIG. 13, "Stationary" indicates that the output rotation is zero in FIG. 11. "Point 1" indicates that the output rotation is approximately 320 rpm; "Point 2," approximately 855 rpm; "Point 3," approximately 2150 rpm; and "Point 4," approximately 4500 rpm.

Referring back to FIG. 12, the capacity efficiencies η of the variable capacity motors P1 and P2 at "Points 1, 2, and 3" are as follows: at "Point 2" where the capacity of the variable capacity motor P1 is zero, the capacity efficiency η of the variable capacity motor P2 peaks to 0.92; at "Point 1," the capacity efficiencies η of the variable capacity motor P and P2 are both 0.87; and at "point 3" where the vehicle is running at full speed, the capacity efficiency η of the variable capacity motor P2 drops to 0.73.

On the other hand, in FIG. 13 showing the capacity efficiencies η of the continuously variable transmission device of this invention, the variable capacity motor P3 retains a capacity efficiency η as high as 0.92, except at "Point 4" where the capacity efficiency η is 0.82. The variable capacity motor P4 retains a capacity efficiency η as high as 0.92 at "Point 2" although it is 0.88 at "Point 1."

At the final points ("Points 3 and 4" in FIGS. 12 and 13 respectively) where the vehicle is running at full speed, the capacity efficiency η of the conventional continuously variable transmission device shown in FIG. 12 is 0.73, whereas the capacity efficiency η of the continuously variable transmission device of the invention shown in FIG. 13 is 0.82. This invention uses the high efficiencies described above to best advantage and, accordingly, allows the adoption of variable capacity motors of small capacity. Furthermore, in comparison with conventional ones, this invention produces excellent results in terms of the capacity efficiency η.

INDUSTRIAL APPLICABILITY

The technical concepts of this invention can be applied to any apparatuses and devices that allow the application of such concepts.

The invention claimed is:

1. A device for a continuously variable transmission, comprising a plurality of variable capacity motors connected together such that the variable capacity motors form a closed circuit together with a pump, wherein:
   a motor shaft provided for each of the variable capacity motors and an output shaft for extracting rotation are connected via speed change gears of plural gear change ratios, the speed change gears being able to be connected or disconnected and selected via a clutch; and
   the gear change ratios of the speed change gears are set for different variable capacity motors respectively in descending order of equivalent capacities thereof so that one selected from the equivalent capacities of one of the variable capacity motors is assigned as a maximum equivalent capacity, a second maximum equivalent capacity is assigned as one of the equivalent capacities of another one of the variable capacity motors, and a third maximum equivalent capacity is assigned as one of the equivalent capacities of still another one of the variable capacity motors.

2. The device of claim 1, wherein the plurality of variable capacity motors includes a first variable capacity motor including a first port and a second outlet port, and a second variable capacity motor including a third port and a fourth port.

3. The device of claim 2, wherein the pump comprises a port that communicates with the first port and the third port, and another port that communicates with the second port and the fourth port.

4. The device of claim 1, wherein:
   a first speed change gear and a second speed change gear are fitted to a first motor shaft provided for a first variable capacity motor, and
   the first speed change gear is fitted to the output shaft via the clutch to allow transmission of rotation of the first motor shaft to the output shaft.

5. The device of claim 1, wherein:
   a third speed change gear and a fourth speed change gear are fitted to a second motor shaft provided for a second variable capacity motor, and
   the third speed change gear is fitted to the output shaft via the clutch to allow transmission of the rotation of the second motor shaft to the output shaft.

6. The device of claim 1, wherein an equivalent capacity of a variable capacity motor is a product of a maximum capacity of the variable capacity motor and a gear change ratio of a speed change gear that couples a motor shaft provided for the variable capacity motor to the output shaft.

7. A device for a continuously variable transmission, comprising a variable capacity motor and a variable capacity pump/motor connected together such that the variable capacity motor and the variable capacity pump/motor form a closed circuit together with a pump, wherein:
   a motor shaft provided for the variable capacity motor and an output shaft for extracting rotation are connected via speed change gears of plural gear change ratios, the speed change gears being able to be connected or disconnected and selected;
   a motor shaft provided for the variable capacity pump/motor and the output shaft are connected via a speed change gear, the speed change gear being able to be connected or disconnected;
   the motor shaft of the variable capacity pump/motor and a pump drive shaft provided for the pump are connected via a speed change gear, the speed change gear being able be connected or disconnected; and
   the gear ratios of the speed change gears fitted to the motor shaft of the variable capacity motor, the motor shafts of the variable capacity pump/motor, and the output shaft are set in descending order of equivalent capacity such that one equivalent capacity selected from equivalent capacities of the variable capacity motor is assigned as a maximum equivalent capacity, a second maximum equivalent capacity is assigned as an equivalent capacity of the variable capacity pump/motor, and a third maximum equivalent capacity is assigned as still another equivalent capacity of the variable capacity motor.

8. The device of claim 7, wherein:
   the variable capacity motor includes a first port and a second port,
   the variable capacity pump/motor includes a third port and a fourth port, and
   the pump comprises a port that communicates with the first port and the third port, and another port that communicates with the second port and the fourth port.

9. The device of claim 7, wherein:
   a first speed change gear and a second speed change gear are fitted to the motor shaft provided for the variable capacity motor, and
   the first speed change gear is fitted to the output shaft to allow transmission of rotation of the motor shaft provided for the variable capacity motor to the output shaft.

10. The device of claim 7, wherein:
    a third speed change gear and a fourth speed change gear are fitted to the motor shaft provided for the variable capacity pump/motor, and
    the third speed change gear is fitted to the output shaft to allow transmission of rotation of the motor shaft provided for the variable capacity pump/motor to the output shaft.

11. The device of claim 7, wherein the speed change gear that connects the motor shaft provided for the pump/motor and the pump drive shaft is connectable or disconnectable via a clutch.

12. The device of claim 7, wherein the speed change gears that connect the motor shaft provided for the variable capacity motor and the output shaft are connectable or disconnectable via a clutch.

13. The device of claim 7, wherein the speed change gear that connects the motor shaft provided for the variable capacity pump/motor and the output shaft are connectable or disconnectable via a clutch.

14. The device of claim 7, wherein an equivalent capacity of a variable capacity motor is a product of a maximum capacity of the variable capacity motor and a gear change ratio of a speed change gear that couples a motor shaft provided for the variable capacity motor to the output shaft.

15. A method for operating a continuously variable transmission comprising a plurality of variable capacity motors connected together such that the variable capacity motors form a closed circuit together with a pump, the method comprising:
    connecting a motor shaft provided for each of the variable capacity motors and an output shaft for extracting rotation via speed change gears of plural gear change ratios, the speed change gears being able to be connected or disconnected and selected via a clutch; and setting the gear change ratios of the speed change gears for different variable capacity motors respectively in descending order of equivalent capacities thereof so that one selected from the equivalent capacities of one of the variable capacity motors is assigned as a maximum equivalent capacity, a second maximum equivalent capacity is assigned as one of the equivalent capacities of another one of the variable capacity motors, and a third maximum equivalent capacity is assigned as one of the equivalent capacities of still another one of the variable capacity motors; and changing the gear change ratio set for the variable capacity motor having zero capacity to decrease the equivalent capacity thereof; and wherein:

control is exerted such that among the variable capacity motors whose capacities have been maximum, capacity of the variable capacity motor having a greatest equivalent capacity is decreased to zero from a maximum; and control is exerted simultaneously such that the capacity of the variable capacity motor whose equivalent capacity has been decreased due to zero capacity is increased to the maximum from zero.

16. The method of claim 15, wherein an equivalent capacity of a variable capacity motor is a product of a maximum capacity of the variable capacity motor and a gear change ratio of a speed change gear that couples a motor shaft provided for the variable capacity motor to the output shaft.

17. A method for operating a continuously variable transmission comprising a variable capacity motor and a variable capacity pump/motor connected together such that the variable capacity motor and the variable capacity pump/motor form a closed circuit together with a pump, the method comprising:

connecting a motor shaft provided for the variable capacity motor and an output shaft for extracting rotation via speed change gears of plural gear change ratios, the speed change gears being able to be connected or disconnected and selected;

connecting a motor shaft provided for the variable capacity pump/motor and the output shaft via a speed change gear, the speed change gear being able to be connected or disconnected;

connecting the motor shaft of the variable capacity pump/motor and a pump drive shaft provided for the pump via a speed change gear, the speed change gear being able be connected or disconnected; and setting the gear ratios of the speed change gears fitted to the motor shaft of the variable capacity motor, the motor shafts of the variable capacity pump/motor, and the output shaft in descending order of equivalent capacity such that one equivalent capacity selected from equivalent capacities of the variable capacity motor is assigned as a maximum equivalent capacity, a second maximum equivalent capacity is assigned as an equivalent capacity of the variable capacity pump/motor, and a third maximum equivalent capacity is assigned as another equivalent capacity of the variable capacity motor; and changing the gear change ratio set for the variable capacity pump/motor having zero capacity to decrease the equivalent capacity thereof; and wherein:

control is exerted such that capacity of the variable capacity pump/motor having greatest capacity is decreased to zero from a maximum;

control is exerted simultaneously such that the capacity of the variable capacity motor whose equivalent capacity has been decreased due to zero capacity is increased to the maximum from zero; and the motor shaft of the variable capacity pump/motor whose capacity has decreased to zero is disconnected from the output shaft and connected to the drive shaft of the pump.

18. The method of claim 17, wherein an equivalent capacity of a variable capacity motor is a product of a maximum capacity of the variable capacity motor and a gear change ratio of a speed change gear that couples a motor shaft provided for the variable capacity motor to the output shaft.

* * * * *